(12) United States Patent
Antony et al.

(10) Patent No.: US 7,617,133 B1
(45) Date of Patent: Nov. 10, 2009

(54) DYNAMIC DETERMINATION OF ITEM RETURNS DURING TRANSIT

(75) Inventors: Felix F. Antony, Issaquah, WA (US); Donald Kaufman, Kirkland, WA (US); Weiling Yang, Sammamish, WA (US); Jeffrey D. Evarts, Seattle, WA (US)

(73) Assignee: Amazon Technologies, Inc., Incline Village, NV (US)

( * ) Notice: Subject to any disclaimer, the term of this patent is extended or adjusted under 35 U.S.C. 154(b) by 721 days.

(21) Appl. No.: 10/987,214

(22) Filed: Nov. 12, 2004

(51) Int. Cl.
*G06F 17/30* (2006.01)
(52) U.S. Cl. .............................. 705/27; 705/26; 705/28
(58) Field of Classification Search .................. 705/27, 705/26, 28
See application file for complete search history.

(56) References Cited

U.S. PATENT DOCUMENTS

| | | | |
|---|---|---|---|
| 6,085,172 A | 7/2000 | Junger | 705/28 |
| 6,527,180 B1 * | 3/2003 | Dvorkis et al. | 235/462.01 |
| 6,536,659 B1 * | 3/2003 | Hauser et al. | 235/375 |
| 7,287,017 B2 * | 10/2007 | Pellinat | 706/59 |
| 2001/0032147 A1 | 10/2001 | Siegel | 705/26 |
| 2001/0047315 A1 | 11/2001 | Siegel | 705/28 |
| 2002/0013744 A1 | 1/2002 | Tsunenari et al. | 705/28 |
| 2002/0046056 A1 | 4/2002 | Demarco et al. | 705/1 |
| 2002/0077914 A1 | 6/2002 | Shatzkin et al. | |
| 2002/0120535 A1 | 8/2002 | Yu | 705/29 |
| 2002/0138356 A1 | 9/2002 | Dutta et al. | 705/26 |
| 2002/0178076 A1 | 11/2002 | Ross | |
| 2003/0135432 A1 | 7/2003 | McIntyre et al. | 705/28 |
| 2003/0233246 A1 * | 12/2003 | Snapp et al. | 705/1 |
| 2004/0039658 A1 | 2/2004 | Hume et al. | |
| 2004/0143518 A1 | 7/2004 | Siegel | 705/28 |
| 2004/0143519 A1 | 7/2004 | Siegel | 705/28 |
| 2004/0181310 A1 | 9/2004 | Stashluk, Jr. et al. | 700/226 |
| 2004/0193436 A1 | 9/2004 | Stashluk, Jr. et al. | 705/1 |
| 2004/0193438 A1 | 9/2004 | Stashluk, Jr. et al. | 705/1 |
| 2004/0194056 A1 | 9/2004 | Combs et al. | 717/104 |
| 2004/0215531 A1 | 10/2004 | Stashluk, Jr. et al. | 705/28 |
| 2005/0114221 A1 | 5/2005 | Walters et al. | |
| 2005/0137901 A1 | 6/2005 | Siegel | 705/1 |

OTHER PUBLICATIONS

U.S. Appl. No. 11/015,288, filed Dec. 17, 2004, Spiegel et al.

(Continued)

*Primary Examiner*—Robert M. Pond
(74) *Attorney, Agent, or Firm*—Seed IP Law Group

(57) ABSTRACT

Techniques are described for automatically and dynamically determining how to handle items being returned from customers while the items are in transit. Various factors may be considered to determine appropriate item return handling, including by assessing current conditions at the time of the determination. In addition, the dynamic item return handling may include selecting one of various potential return destinations for each item being returned and one of various types of return routing for the return. In some situations, the item return handling is performed for an item being returned from a customer while the item is at an intermediate shipping location, such as a selected location to which the customer was directed to send the item. This abstract is provided to comply with rules requiring an abstract, and with the intention that it will not be used to interpret or limit the scope or meaning of the claims.

56 Claims, 11 Drawing Sheets

OTHER PUBLICATIONS

U.S. Appl. No. 11/015,290, filed Dec. 14, 2004, Spiegel et al.
Newgistics, Inc., "Newgistics Introduces First Suite of Solutions for End-To-End Intelligent Returns Management$^{SM}$," Oct. 27, 2004, retrieved Nov. 1, 2005, from http://www.newgistics.com/news/pr/press_04.10.27.html, 2 pages.
Newgistics, Inc., "Newgistics Launches SmartLabel® Returns Center," Sep. 20, 2004, retrieved Oct. 19, 2005, from http://www.newgistics.com/news/pr/press_04.09.20.html, 2 pages.
"SmartLabel Features & Benefits," retrieved Nov. 1, 2005, from http://www.newgistics.com/products/SL_benefits.html, 1 page.
"Intelligent Returns Management—How it Works.pdf," retrieved Nov. 1, 2005, from http://www.newgistics.com/solutions/index.php, 2 pages.
"Mail By Rail," retrieved Nov. 1, 2005, from http://www.postalmuseum.si.edu/exhibits/2c1_railwaymail.html, 2 pages.
"Inside the Railway Mail Car" retrieved Nov. 1, 2005, from http://www.postalmuseum.si.edu/exhibits/2c1a_insiderms.html, 2 pages.
"Highway Post Office Buses," retrieved Nov. 1, 2005, from http://www.postalmuseum.si.edu/exhibits/2c1e_hypobus.html, 2 pages.
Amazon.com, Inc., "Problem with an Order?" retrieved Jun. 14, 2004, from http://www.amazon.com/exec/obidos/tg/browse/-/557204/002-4411800-9558405, 2 pages.
Amazon.com, Inc., "Need to Return an Item?" retrieved Jun. 14, 2004, from http://www.amazon.com/exec/obidos/tg/browse/-/901888/ref=hp_hp_ct_3_1/002-4411800-9558405, 2 pages.
Amazon.com, Inc., "Return Shipping Methods," retrieved Jun. 14, 2004, from http://www.amazon.com/exec/obidos/tg/browse/-/3484061/pop-up/002-4411800-9558405, 1 page.
Amazon.com, Inc., "Select Your Shipping Method," retrieved Jun. 14, 2004, from http://www.amazon.com/gp/css/returns/submit-items-to-return.html/002-4411800-9558405, 1 page.
The Return Exchange, Inc., "Return Authorization," retrieved May 18, 2004, from http://www.thereturnexchange.com/products/index.asp, 1 page.
United Parcel Service of America, Inc., "Returns," retrieved May 18, 2004, from http://www.theupsstore.com/products/ret.html, 1 page.
Palo Alto Software, Inc., "Services," retrieved May 18, 2004, from http://www.bplans.com/spv/3219/3.cfm, 8 pages.

* cited by examiner

Web Merchant MMM  /—100c

Customer CCC>Returns Center>USPS Return Mailing Label

Important Message
Because your return is not the result of our error, shipping costs associated with your return will be deducted from the amount of your refund. }110c Please print this page, then (Continue ▷)
 cut out the label along the.....lines }151   /—150

```
FROM: _____
        _____            NO POSTAGE
        _____            NECESSARY IF
                                   MAILED IN THE
POSTAGE DUE COMPUTED BY DELIVERY UNIT    UNITED STATES
              POSTAGE  $_____
    MERCHANDISE RETURN FEE  $_____
  TOTAL POSTAGE AND FEES DUE  $_____
```

PARCEL SELECT RETURN SERVICE ~150a
150c— Web Merchant MMM    PERMIT NO. 1111
                                          ~150b

BMC ZIP – USPS PARCEL RETURN SVC    RETURN BULK MAIL CTR
154                                  12345 Main Street         }153
                                     Town1, State1, ZIP1

1206 0130 9157 0268 3733 1000 0010 15

160a—FOR WEB MERCHANT MMM   USE ONLY:
          eerg17113—160b

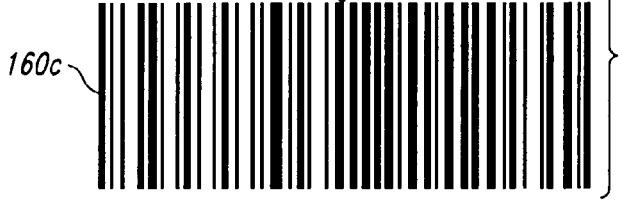

Web Merchant MMM – Return Processing Instructions

ORDER #1245     RMA: 1111111111  } 165

ITEMS: item B

---

1. Print the Return Mailing Label page.
2. Cut out the Merchandise Return Label.
3. Write your return address in the space provided in the upper-left corner of the label, after the word "FROM."
4. Securely pack the items to be returned in a box and, if possible, include the original packing slip in the package.
5. Affix the Merchandise Return Label securely to the package.
6. Take the package to your nearest post office for delivery. No postage is necessary if the package is mailed from within the United States.

Please note: Your refund will be processed in 7 to 14 business days once your return has been received. Shortly after it has been processed, you will receive an e-mail regarding your refund.

DYNAMIC DETERMINATION OF ITEM RETURNS DURING TRANSIT

TECHNICAL FIELD

The following disclosure relates generally to handling the return of merchandise, and more particularly to dynamically determining the routing of items being returned.

BACKGROUND

The World Wide Web ("the Web") allows users of Web browser applications to retrieve information (e.g., Web pages) from Web servers and display that information. The Web has also increasingly become a medium used to shop for items, such as products or services for purchase, rent, lease, license, trade, evaluation, sampling, etc. Indeed, a vast number of different items may be ordered or obtained on the Web. In many circumstances, a user who plans to purchase an item on the Web can visit the Web site of a Web merchant that sells the item, view information about the item, give an instruction to purchase the item, and provide information needed to complete the purchase, such as payment and shipping information.

After receiving an order for one or more items, a Web merchant fulfills that order by determining how and when to provide the items to the customer. The order fulfillment process typically used by Web merchants shares some similarities with other item ordering services (e.g., catalog-based shopping, such as from mail-order companies) in which ordered items are shipped, such as from a centralized distribution center that maintains the ordered item in inventory.

Although Web-based and catalog-based shopping can provide various advantages, such transactions can also have certain disadvantages. For example, some such disadvantages involve difficulties to customers and merchants in the conventional handling of the return of unwanted items. Such item returns can occur for a variety of reasons, including customers having purchased the wrong item, delivered items that are defective, an error in the order fulfillment process that resulted in the wrong item being provided or an item being provided to the wrong recipient, and the customer merely changing their mind. While there are many reasons that may lead to a customer's decision to return an item, a customer nonetheless typically desires to easily transfer possession of the item to the merchant and quickly receive any applicable refund or credit. Conversely, a merchant typically desires to minimize the cost of processing the return, maximize customer satisfaction regarding the returns process (e.g., by minimizing the activities required of the customer), quickly dispose of the returned items in the most economically advantageous manner, and protect itself from unscrupulous customers who attempt to improperly obtain refunds (e.g., for items that have been damaged or switched after delivery).

In a traditional brick-and-mortar retail store, customers conduct business in person, and returns are usually processed at the store. Such stores generally have the personnel and facilities to verify the condition and identity of the returned items, take possession of the items, and process any refund. Furthermore, such retail stores customarily have the infrastructure to resell items that are in good condition or to return items to a manufacturer or distributor as appropriate.

Web merchants have conventionally used a returns processing approach similar to that of brick-and-mortar retailers, such as by designating in advance one or more of their distribution centers or other specialized return centers (e.g., centers geographically distributed throughout the areas in which customers typically reside) to which customers ship all returned items. In many cases, a customer who would like to return an item first contacts the Web merchant to obtain a Return Merchandise Authorization (RMA) number for the item, such as via phone or the Web site of the merchant, which allows the Web merchant to estimate a volume of returned items that is expected and to later track shipped packages with returned items based on RMA numbers included with the packages. After receiving and verifying the returned items, the merchant typically issues a refund or credit to the customer as appropriate.

In other situations, a Web merchant may designate in advance one or more third-party return locations to which all items being returned will be shipped, such as a return processing location of a third-party service provider who performs specified types of processing on the items. For example, some such third-party service providers may perform activities to verify received items before forwarding the items back to the merchant, or in other situations may dispose of the returned items in manners other than returning them to the merchant (e.g., by storing the items until they are distributed to another destination). In other situations, a pre-designated third-party return location may merely be an off-site location that receives shipped packages having returned items so that the merchant can retrieve their packages from that location, such as by using Parcel Return Services of the regional Bulk Mail Centers (BMCs) of the United States Postal Service (USPS).

Unfortunately, these conventional returns processing approaches create various problems for Web merchants. For example, when a customer is not geographically near a pre-designated return location, the shipping of the items being returned may be expensive and may take an unduly long time to occur, resulting in a longer time before the customer receives their refund and before the Web merchant is able to resell the item. Furthermore, delays in return processing can create particular financial difficulties for merchants if the items being returned depreciate in value rapidly. In addition, for merchants that sell a wide variety of merchandise, some types of items may require specialized return processing (e.g., items of high value and/or of technical complexity, such as jewelry or electronics) that is costly to replicate at multiple locations, and thus items of that type that are being returned may ultimately need to be sent to a single remote location that performs the specialized return processing.

In light of these problems with conventional methods for processing returned items, it would be beneficial to have a more effective approach to return processing.

BRIEF DESCRIPTION OF THE DRAWINGS

FIGS. 1A-1D are example user interface screens that may be provided to users of a Web-based item ordering service in order to assist in dynamically determining appropriate handling of item returns based at least in part on current conditions.

DETAILED DESCRIPTION

A software system is described below that, for items being returned from customers, assists in automatically and dynamically determining how to handle the item returns while the items are being returned, such as on behalf of one or more merchants that originally supplied the items to the customers. In some embodiments, a customer returning an item is directed to send the item in such a manner that the item is directed to an intermediate shipping location. After the item being returned is in transit, such as after it is received at the intermediate shipping location, appropriate handling of the item return can be determined, such as to dynamically select the final return destination for the item (e.g., based on then-current conditions) and/or to dynamically determine one or more particular manners for performing the remaining portion of the item return. The item can then be forwarded from the intermediate shipping location to the selected final return destination and/or in the dynamically determined manner.

A variety of types of intermediate shipping locations can be used in various embodiments, including various types of third-party facilities that are not under direct control of a merchant or other party on whose behalf the dynamic item disposition processing is being performed. Such third-party intermediate shipping locations may include governmental shipping facilities (e.g., facilities of the United States Postal Service, or "USPS") and/or private shipping facilities (e.g., facilities of United Parcel Service or of other similar shipping services). For example, the USPS currently has a number of regionally located Bulk Mail Centers ("BMCs") at which a merchant (or other party) who meets qualifications specified by the USPS can pick up items that are received at the BMC on behalf of the merchant, and at which such a merchant can drop off items to be shipped to specified destinations. Moreover, each BMC may have multiple Auxiliary Service Facilities ("ASFs") throughout a geographic region that the BMC serves, and such ASFs may provide similar services. Furthermore, in some situations, individual USPS post offices may each provide similar services, such as when acting as Designated Delivery Units ("DDUs") at which customers deposit items being returned. Thus, in some embodiments such BMCs, ASFs, and/or DDUs may be used as intermediate shipping locations, while in other embodiments a variety of types of locations associated with private shipping services could instead be used.

Figure 1A:
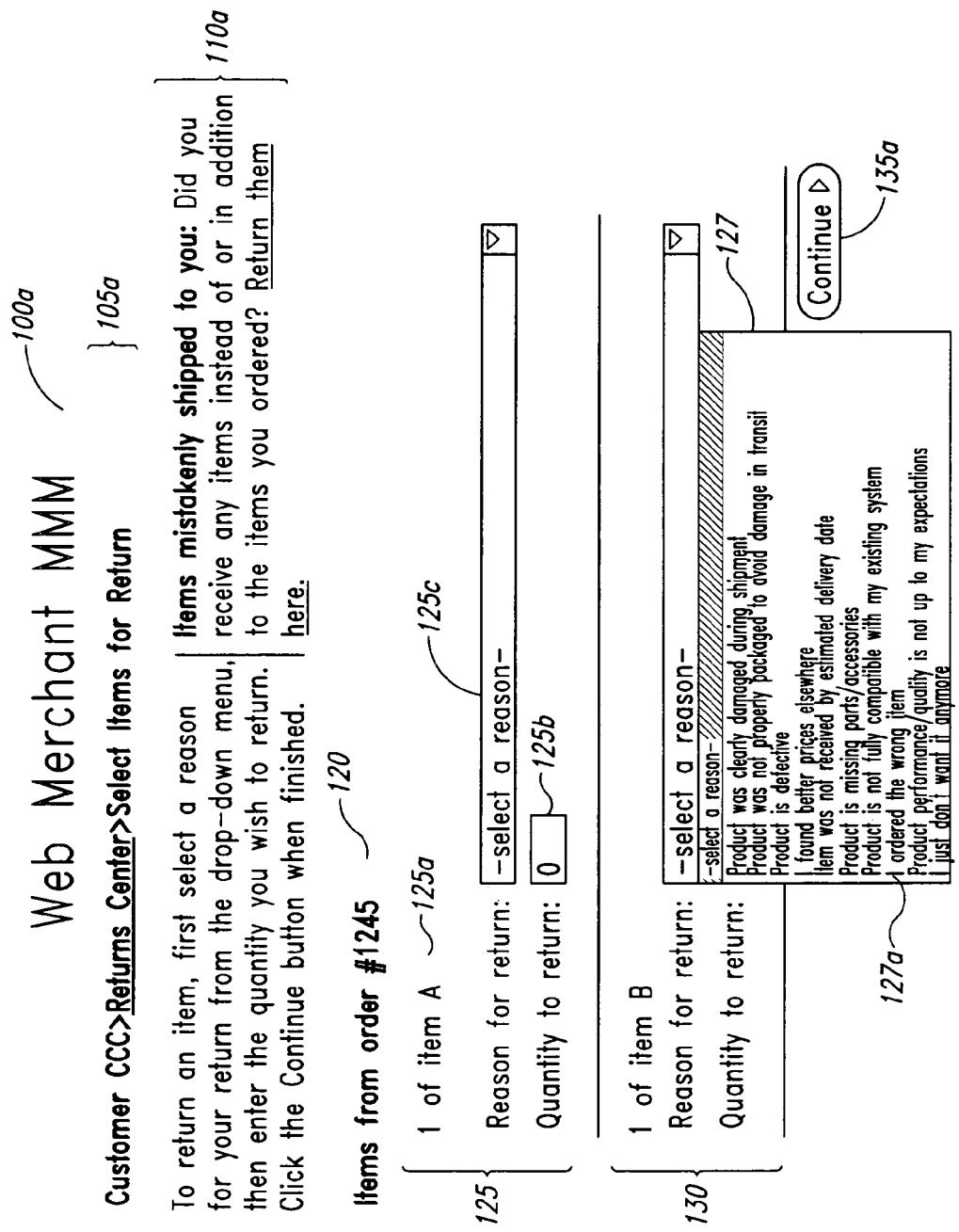
Figure 1B:
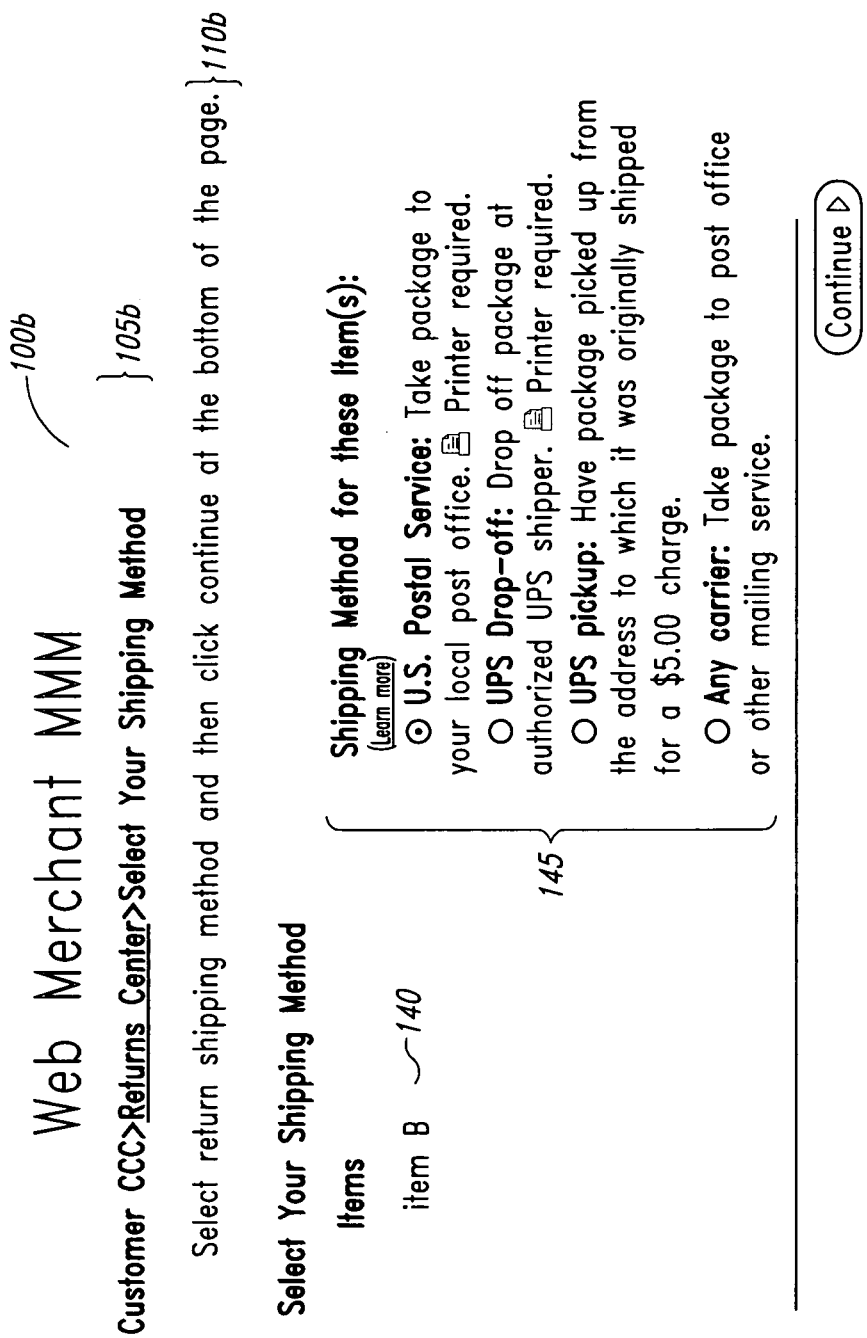
Figure 1E:
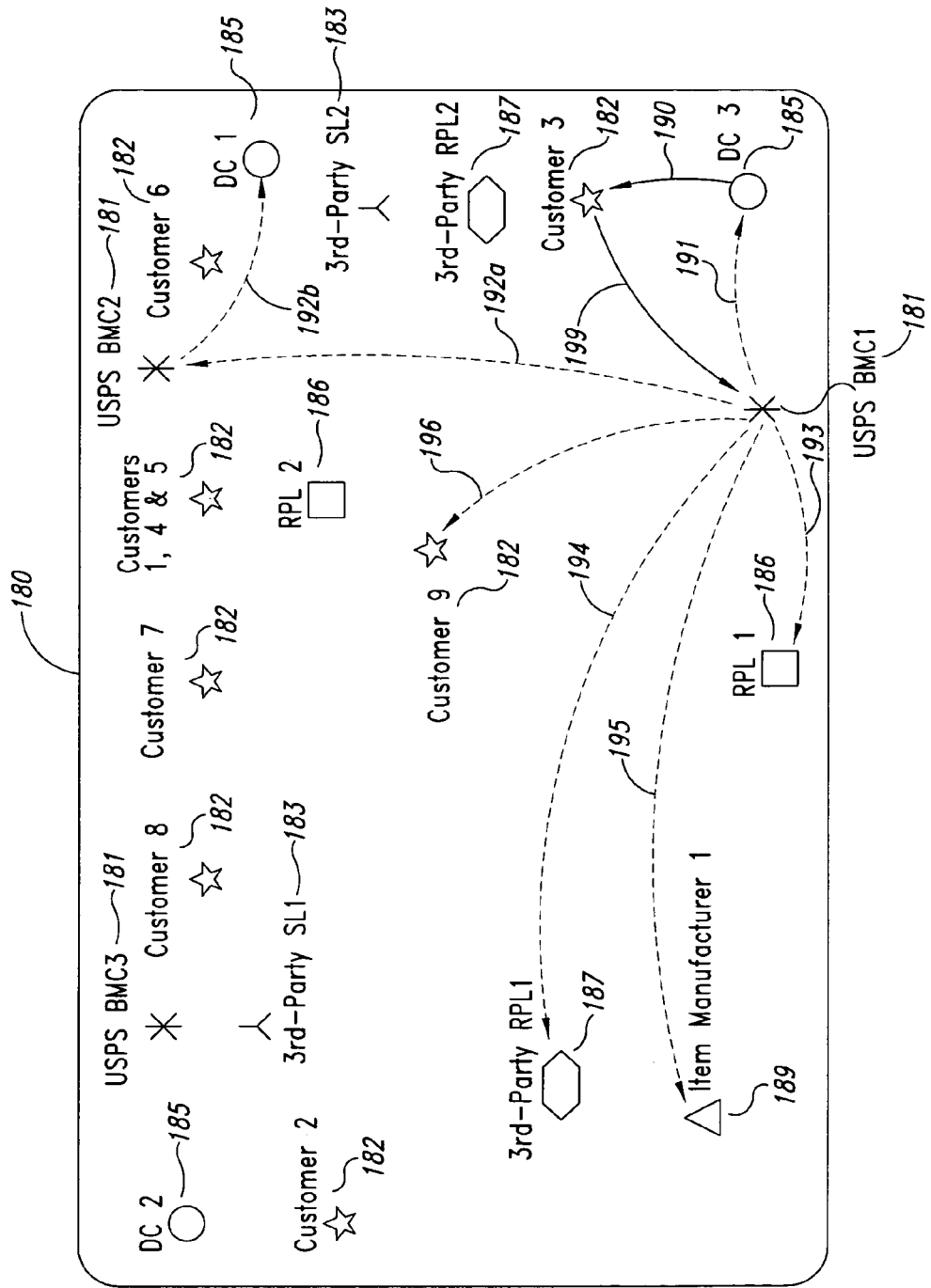
FIG. 1E illustrates examples of dynamically determining an appropriate return processing location for an item based on a variety of factors and on current conditions while the item is in transit.

FIG. 1E illustrates various examples of using an intermediate shipping location to dynamically route an item that is being returned to an appropriate final return destination while the item is in transit. In particular, in the illustrated example a variety of customers 182 of a merchant are distributed at various locations within a geographical area 180, and the merchant has several item distribution centers ("DCs") 185 that are also distributed at various geographical locations. When a customer of the merchant orders an item from the customer, the merchant selects one of the DCs to fulfill the order by providing the ordered item to the customer—the selection of a DC for an item order can be made in various ways and based upon various factors, including geographical distance between the DC and the customer. In this example, the DC 3 distribution center of the merchant has previously supplied 190 one or more items to Customer 3, and Customer 3 would now like to return one of those items to the merchant, such as for refund or other compensation, exchange or repair.

In this example, Customer 3 is directed to return 199 the item in such a way that the item is sent to intermediate shipping location BMC 1 with the merchant indicated as the recipient—as discussed in greater detail elsewhere, such an item return can be performed in various ways, and FIG. 1C illustrates one example of a shipping label that may be used for this purpose. In addition, BMC 1 (which is one of several geographically distributed USPS Bulk Mail Centers 181 in this example) can be selected to be the intermediate shipping location for Customer 3 and the item in various ways (e.g., based on Customer 3 being in the geographic area associated with BMC 1) and at various times, and Customer 3 can be notified of the selected intermediate shipping location in a variety of ways. For example, Customer 3 may interact with a graphical user interface of a Web site (not shown) of the merchant to initiate the item return and to provide various information about the item return, and may receive a real-time response from the merchant via the Web site that provides information about the intermediate shipping location, such as a mailing label to be printed by the customer and used with a package containing the item in order to direct the package to the intermediate shipping location.

In at least some such embodiments, the intermediate shipping location may be dynamically selected in response to the customer's interactions, such as based on information provided by the customer during the interactions. Alternatively, in some embodiments the intermediate shipping location for use by a customer for an item may instead be determined before the item was initially provided to the customer, and if so the customer may be notified of that intermediate shipping location by providing corresponding information to the customer along with the initial item shipment (e.g., a shipping label directed to that intermediate shipping location for use with a return if it occurs). In yet other embodiments, a particular intermediate shipping location may not be selected by the system, such as when information associated with an item return destination (e.g., a zip code assigned to a merchant to whom the item is being returned) is instead provided to the customer, and a third-party shipper (e.g., the USPS) or other transportation company directs the item from the customer to an appropriate intermediate shipping location based on the item return destination.

In this example, after the item being returned is received at BMC 1, the merchant dynamically determines an appropriate final return destination for the item and arranges for the item to be sent from BMC 1 to that final return destination. The sending of the item from BMC 1 to the final return destination can be arranged in various ways, such as by a representative of the merchant who physically retrieves the item at BMC 1 (as well as any other items at BMC 1 that are directed to the merchant), changes the shipping information for the item to direct it to the final return destination (e.g., by printing a new shipping label and attaching it to the package containing the item), and sends the item from BMC 1 to the final return destination without removing the item from the BMC 1 facility (e.g., by using cross-docking techniques to move the item from an incoming loading dock to an appropriate outgoing loading dock). In this example, a representative of the merchant may periodically visit each BMC (e.g., every day) to identify packages received at the BMC for the merchant and to forward them to appropriate final return destinations—in doing so, the merchant representative may further carry a portable computing device to assist in their item processing, such as to print new labels and to determine appropriate final return destinations (whether locally at the portable computing device and/or by communicating with a remote system to receive such information, such as via a wireless connection).

While not illustrated in this example, the merchant may in some embodiments, in addition to dynamically determining an appropriate final return destination for the item, also dynamically determine an appropriate manner for sending the item to the final destination and arrange for the item sending to be performed in that manner, such as to select a manner or type of routing the item to the final destination by using a particular shipping carrier (e.g., the United States Postal Service, a specified private shipping company, etc.), by using a particular transportation speed (e.g., next-day air, ground shipping, etc.) and/or transportation mode (e.g., by truck, train, air, cargo ship, etc.), by using a particular shipping method (e.g., with specified options for tracking the item shipment and/or verifying delivery, by specifying a selected amount of transportation insurance, by specifying how and from whom payment for the shipping will be provided, etc.), by using a particular transportation path or other route, etc. Furthermore, while also not illustrated in this example, the merchant may in some embodiments allow the customer to participate in the dynamic determining of the final destination and/or routing for the sending to the final destination (e.g., for a fee, as a perquisite for preferred customers, etc.), such as by presenting options to the customer and allowing them to select or otherwise specify preferences via a graphical user interface of a Web site (not shown) of the merchant.

A variety of types of return destinations may be selected for items, as illustrated in FIG. 1E, although in some embodiments only some of the illustrated types of return destinations may be used and/or other types of return destinations that are not illustrated here may be used. In this example, potential return destinations for the item include the multiple DCs of the merchant, multiple return processing locations ("RPLs") 186 of the merchant that process item returns but are not DCs (e.g., to provide various types of specialized return processing), multiple RPLs 187 of third parties that process item returns for the merchant (e.g., based on a predefined business relationship), a location 189 of the item manufacturer or other party involved in the initial supply of the item to the merchant (e.g., a distributor or other intermediary), and other customers of the merchant.

Thus, as one example, the item being returned may be sent 191 back to the DC 3 distribution center from BMC 1, such as to allow the item to be re-distributed to another customer to fulfill an order from that other customer if the item is in an appropriate condition (e.g., not defective and still in new condition). The DC 3 distribution center may be selected in this example over other DCs for various reasons, such as based on DC 3 being the nearest DC to BMC 1 and/or being the DC from which the item was previously distributed to Customer 3.

Alternatively, another DC may be dynamically selected as the final return destination for the item return, such as to instead send the item from BMC 1 to distribution center DC 1 based on current conditions. In this example, the item is first sent 192*a* to BMC 2 before being transported 192*b* to DC 1 (whether by the USPS, or by a representative of the merchant who retrieves the item from BMC 2). The current conditions used to select DC 1 as the final return destination may include a variety of types of factors, such as DC 1 having a current need for the item (e.g., based on a low inventory level relative to current or projected demand for the item) and/or based on an inability of other distribution centers (e.g., DC 3) to effectively handle the item return (e.g., based on a current lack of storage space or labor capacity to handle the item return processing). Alternatively, other types of conditions could make DC 1 a more attractive return destination for the merchant than DC 3 for the item at the current time, such as temporary conditions that make an item return to DC 3 difficult (e.g., bad weather or a natural disaster near DC 3, bad traffic near DC 3, a workers' strike at DC 3 or along the route from Customer 3 to DC 3, etc.). Other factors can similarly influence the selection of a return destination and/or intermediate shipping location, such as legal or cost restraints related to transporting at least some types of items between certain locations (e.g., duties and/or other taxes related to moving items to and/or from a country or state, laws regulating movement of items between countries or between states, etc.) and/or manners of transporting certain categories of items (e.g., hazardous materials or firearms). BMC 2 may be selected for use in this example for various reasons, such as it being the Bulk Mail Center that serves the area in which DC 1 is located. Furthermore, in other embodiments BMC 2 could instead be selected by the merchant's representative at BMC 1 as the final return destination for the item in this example (even if the merchant intends to ultimately transport the item to DC 1), such as when the merchant chooses to retrieve the item from BMC 2 (e.g., based on cost considerations and/or on USPS policies).

More generally, a particular potential return destination may be dynamically selected as an appropriate or optimal choice for the item return based on receiving the highest evaluation among multiple potential return destinations for one or more criteria of interest, such as lowest total cost to the merchant for the return. Such cost considerations may include not only direct costs to the merchant (e.g., costs for shipping the item to a return destination and labor costs for processing the item return), but also a variety of other types of costs related to disposition of the item after the return processing and customer goodwill. For example, minimizing total costs for the item return given the current conditions may include returning the item as quickly as possible, such as based on the item being of particularly high value, the item being perishable or otherwise likely to depreciate in value during a lengthy return process, the customer being of particularly high value to the merchant and/or particularly eager to receive a refund after the item has been returned, the customer being willing to pay extra for a rapid and/or convenient item return process, etc.—if so, DC 1 may be selected over DC 3 based on being able to process the item return more quickly (e.g., based on an ability to transport the item more rapidly to DC 1 than DC 3 and/or an ability of DC 1 to process the item return more rapidly).

In other situations, return destinations of types other than DCs may be dynamically selected while the item being returned is in transit based on a variety of types of factors. For example, a merchant or third-party RPL may be selected for an item based on having special return processing capabilities, such as capabilities to verify the condition of the item being returned (e.g., to verify authenticity of jewelry items, such as when fraud is suspected or, alternatively, for all jewelry item returns), or capabilities to provide repair/refurbishment activities for items that are defective or whose condition is not sufficiently new. In other situations, an RPL may instead merely provide standard item return handling capabilities, such as to receive items being returned and forward them to appropriate other ultimate destinations as instructed (e.g., to forward defective items to repair locations and to forward non-defective items to an appropriate distribution center.) Thus, FIG. 1E also illustrates examples of the item being sent 193 from BMC 1 to a merchant return processing location RPL 1 or alternatively sent 194 to a third-party return processing location RPL 1.

In other situations, other types of factors may cause other types of return destinations to be selected for an item being returned. For example, if an item provided to a customer is defective, in some situations a manufacturer or other supplier of the item will provide direct vendor replacement services in which the item can be returned directly to the item supplier in order to rapidly receive a replacement or a refund from the supplier. If so, the item may be sent 195 to Item Manufacturer 1 from BMC 1—while not illustrated in this example, Item Manufacturer 1 may subsequently return a repaired or replacement item to Customer 3. Alternatively, if the current conditions are appropriate, the item may instead be sent 196 to another customer, such as Customer 9, in order to fulfill an order from that customer to the merchant. Appropriate conditions for sending an item directly from a first customer to another customer may include that the item is not defective and is in sufficiently good condition, that original packaging is available for the item (if it was opened), and/or that information about the first customer (e.g., based on prior interactions between the first customer and the merchant) indicates that the first customer is sufficiently trustworthy to allow them to send items to other customers on behalf of the merchant. Moreover, by using an intermediate shipping location in this way, information about the new customer can be kept private from the first customer, since the first customer may be directed to send their item return to the intermediate shipping location without providing any information about the new customer that will ultimately receive the item being returned.

While not illustrated here, the return processing for an item may further involve a variety of types of activities after the item is sent to the dynamically selected return destination. For example, in addition to the types of return processing capabilities previously noted, additional activities in regard to the item return handling may also be performed, such as activities of a DC or RPL to subsequently forward a returned item to another customer, a DC, an RPL, an item supplier location, or other destination. Similarly, a variety of types of additional activities could be performed at intermediate shipping locations before forwarding items on to final return destinations (e.g., to verify package contents or external condition). In addition, given that the determination of a return destination for the item at BMC 1 is performed in this example in a dynamic manner while the item is at BMC 1, it will be appreciated that distinct returns of the same item by Customer 3 at different times (e.g., separated by an hour or a day) may produce different dynamically selected final return destinations at BMC 1 based on changing conditions.

Thus, a variety of types of final return destinations may be dynamically selected in various embodiments as part of a dynamic process for determining how to handle item returns while the items being returned are in transit, including one or more distribution centers for the merchant from whom the customer previously received an item being returned, one or more specialized return processing locations for the merchant, one or more third-party return processing locations that receive item returns on behalf of the merchant (e.g., to perform various processing of the items and/or to forward the items to the merchant or elsewhere as specified by the merchant), one or more locations for the manufacturer or other supplier of the item (e.g., for direct vendor returns), one or more other customers (e.g., to forward an item that is not desired by the customer performing the return to another customer that does desire the item), etc. While not illustrated in this example, other types of final destinations may also be selected in other situations, such as to send item returns that are suspected to be fraudulent to appropriate law enforcement or other investigative personnel for immediate handling and/or to preserve a chain of evidence (e.g., for returns of items from item shipments sent to customers suspected of repeated fraud that were reviewed and/or flagged at the time of original item shipment).

In some embodiments, the dynamic item return handling determination process is initiated by an indication that an item is to be returned from a customer, such as an indication received from the customer. For example, an interactive mechanism (e.g., a Web site or instant messaging) may be provided via which a customer can indicate a desire or intention to return one or more items and can specify additional information related to the returns. A variety of types of additional information may be specified and used in the dynamic determination process in various embodiments, including various reasons for the return of each of the items, information about the current location of the item(s) and/or the customer, information about the condition of the item(s), information about the condition of packaging for use in returning the item(s), customer preferences or instructions related to how and when the return processing will occur (e.g., how the item(s) will be transported to the selected return processing location), etc. As discussed in greater detail below, FIGS. 1A-1D illustrates examples of user interface screens that may be used in some embodiments to perform at least some such interactions with customers. Alternatively, the indication that an item is to be returned can be received in other ways and for other reasons in some embodiments, including from the merchant that supplied the item and/or from other parties (e.g., the item manufacturer or other supplier, a government agency, etc.), and for reasons that are not initiated by the customer (e.g., a recall of the item).

In embodiments in which information is received from customers via an interactive mechanism, that interactive mechanism or other communications mechanisms (e.g., email or fax) may in some situations be further used to dynamically provide information to a customer regarding how to perform the item return, while in other embodiments such information may be provided to a customer prior to an indication that the item is to be returned. Information provided to a customer regarding how to perform an item return may include information on how and where to ship the item to a selected intermediate shipping location (e.g., by displaying a shipping label on a Web page that the customer can print and use for the item return). In addition, the information provided to the customer may further include information to be used by the merchant or other entity performing the return processing (e.g., an RMA number, information about the reasons for an item return for dynamically provided information, etc.), such as by including the information on the shipping label or with other information to be included with the item return. If so, information included on the shipping label or that is otherwise accessible at the intermediate shipping location may be used as part of the dynamic determination of a final return destination for the item.

As previously noted, the selection of an intermediate shipping location for an item being returned from a customer can be made in various ways, and may further consider a variety of factors. For example, factors relevant to customers include a location of the customer, a sensitivity of the customer to activities that they need to perform to return an item (e.g., deposit by the customer at a nearby location) and/or to delays in receiving refunds for item returns, a current and/or projected future value of the customer to the merchant, any contractual restrictions or other agreements with the customer concerning item returns, etc. In embodiments in which an interactive mechanism is used to receive information from a customer about an item return, the selection of the intermediate shipping location may be made dynamically after the information is received from the customer (e.g., based on that received information).

After an item being returned is in transit from a customer, such as when the item is at an intermediate shipping location, current information about a variety of types of factors can be assessed in order to dynamically determine how the final item return handling is to occur, including by dynamically selecting an appropriate final return destination and/or dynamically selecting an appropriate manner of routing an item to a final return destination. Information about current values for various factors based on current conditions can be gathered and used in the dynamic item return handling determination process in various ways, as discussed in greater detail below.

In particular, in some embodiments some factors may trigger specialized handling for an item return if they apply, while in other embodiments a variety of factors may be considered in combination when determining appropriate item return handling. For example, specialized item return handling factors may include whether the item is being recalled, whether fraud is suspected as part of the return of the item (e.g., based on information about prior activities of the customer, information provided by the customer when indicating the desire to return the item and/or information acquired about the item after it is in transit, such as based on an inspection at the intermediate shipping location), whether the item is one for which another party provides specialized return processing (e.g., direct vendor replacement from an item manufacturer or distributor), whether the item is of one or more predefined types or categories for which specialized processing is performed, etc. If one of the specialized handling factors does apply for an item being returned, corresponding predefined processing for that factor may be dynamically selected for the final item disposition, such as by forwarding the item from the intermediate shipping location to a predetermined final return destination corresponding to that factor (e.g., a return location with specialized handling capabilities for a type of item, such as to inspect jewelry items being returned), by routing or otherwise performing the item return to a final return destination in a predetermined manner, and/or by performing additional predefined activities related to the item (e.g., performing additional review of items for which fraud is suspected). Moreover, if multiple of the specialized handling factors apply for an item being returned, the dynamic item return handling may include processing corresponding to multiple or all of the applicable factors in some embodiments, while in other embodiments a single one of those applicable factors (e.g., the factor with the highest priority) may be used to determine the appropriate dynamic item return handling (e.g., by using a decreasing order of priority based first on item recalls, next on suspected fraud, next on processing for predefined item types or categories, etc.).

In embodiments in which specialized item return handling factors are not used or in situations in which no specialized item return handling factors apply to an item being returned, a combination of various factors may potentially be considered when determining an appropriate final return location or destination and/or when determining an appropriate manner of routing the item to a final return destination or otherwise performing that portion of the item return. Such factors may generally include information about the customer, information about the item, information about capabilities and current status of various potential return destinations (e.g., regarding processing the return of the item), information about current capabilities and status regarding transporting the item to the potential return destinations, and information about capabilities and current status of the potential return destinations or other related locations regarding ultimate disposition of the item (if any) after any initial return processing is complete.

For example, factors relevant to potential return destinations may include factors that reflect a need for the item (e.g., inventory levels at a distribution center that are low relative to current or projected demand), factors that reflect an expressed desire to receive the item (e.g., an order from another customer for the item, or an indication from a return processing location that it has excess capacity), and factors that reflect an ability to handle the processing of the return of the item and/or any ultimate disposition of the item after the return processing (e.g., capabilities of a return location in handling some or all items and/or some or all types of processing, current and projected labor capacity, current and projected storage capacity, etc.). Factors relevant to transportation of an item to a final return destination include factors that affect the time and cost of moving the item to that location (e.g., distance between a current location and the return location, types of transport mechanisms between the two locations, types of return-related services to be provided by a carrier performing the transportation and/or other third party, etc.), factors relevant to legal restrictions regarding the movement (e.g., legal restrictions or additional costs associated with various types of item movements, such as across country or state boundaries, and/or legal restrictions or additional costs associated with items of specific types, such as hazardous materials or firearms), and factors that reflect an amount or type of effort needed to direct the item to the final return destination (e.g., activities by a human representative at the intermediate shipping location). Factors relevant to an item include a location of the item, attributes of the item that affect the ability to transport the item (e.g., weight, any special handling requirements, etc.), items of types or categories that require special handling, a value of the item, any projected depreciation or other change in value of the item during the item return handling, a current status and condition of the item (e.g., defective, operable but in slightly used condition, etc.), information about the packaging for the item, etc.

The combining of the various factors to dynamically determine an appropriate final return destination and/or other dynamic handling for an item return can be performed in various ways in various embodiments. In some embodiments, each of multiple potential return destinations for an item is treated as a distinct option for the item return and is evaluated relative to the other potential return destinations based on the various applicable factors. In other embodiments, some or all of the potential return destinations may instead each have multiple associated return options, with each of the options including a unique combination of a return destination and of a manner of routing the item to the return destination. More generally, in some embodiments the system may consider a variety of factors with respect to each of the options being considered, including different manners of performing a final disposition of the item from the return destination after return processing has been performed.

When combining multiple factors in order to evaluate a dynamic return option relative to other dynamic return options, a relative effect or influence of each of the factors on the evaluation can be specified in various ways. In some embodiments, each factor has an associated weight (or multiple weights that each correspond to a group of items, such as items of a specified type or category), and the weights for the factors are used to calculate a weighted score for each of the dynamic return options based on current values of the factors for those options. Such weights can take a variety of forms in different embodiments, including numeric, boolean and/or enumerated values. Using such weighted scores, the dynamic return options can be ranked (e.g., based on highest or lowest weighted score), and one or more of the most appropriate or desirable options based on rank can be dynamically selected for use with an item return. In other embodiments, information about how various of the factors contribute to one or more higher-level criteria may further be specified, and that higher-level criteria may then be used to evaluate the various dynamic return options. For example, a merchant may desire to minimize the overall costs of performing the return processing, and the contribution of the various factors to various costs for a dynamic return option may be specified, such as the costs of transporting an item to a return destination for the option in a specified manner, the costs of performing any return processing at the return destination, the costs of performing any final disposition processing for the item after return processing is completed, and modeled customer goodwill costs. Additional details related to using various factors and criteria in making decisions related to item handling are included in co-pending U.S. patent application Ser. No. 09/965,125, filed Sep. 27, 2001 and entitled "Generating Current Order Fulfillment Plans Based On Expected Future Orders," and in co-pending U.S. patent application Ser. No. 10/916,772, filed Aug. 11, 2004 and entitled "Dynamically Classifying Items For International Delivery," both of which are hereby incorporated by reference in their entirety. This application is also related to U.S. patent application Ser. No. 10/987,213, filed concurrently and entitled "Dynamic Determination Of Item Returns," which is also hereby incorporated by reference in its entirety.

In addition, in some embodiments the effect or influence of factors on item return handling can be dynamically configured by administrative users (e.g., representatives of a merchant for which the dynamic item return handling processing is being performed), such as users that are authorized to make such changes. For example, in some embodiments administrative users can dynamically configure the weights associated with various factors or otherwise specify how those factors will influence dynamic item return handling processing, including by indicating that certain factors have no weight or influence. Such configurations by administrative users may in some embodiments be made on a temporary basis, or more generally may have conditions specified by the administrative users to indicate when they will apply (e.g., times at which the configurations will be effective, types of items or customers for which the configurations will be effective, etc.). Such configurability allows administrative users to rapidly adapt the response of the dynamic processing to changing conditions and situations, such as to temporarily divert items being returned to or away from a specified return destination.

In addition, information about current values for factors can be determined in a variety of ways in various embodiments. For example, with respect to factors related to conditions at return destinations and/or intermediate shipping locations, such conditions may be electronically accessible in some situations based on predefined relationships (e.g., based on their belonging to or being affiliated with a single organization on whose behalf the dynamic disposition determination processing is being performed, such as a merchant, or instead based on having a predefined relationship with that organization). Current information about customers and items can also be obtained in a variety of ways, including by accessing information from the merchant related to items and customers, by obtaining information from the customers related to the items and themselves (e.g., current status and condition of items, current location of items and/or customers, etc.), and by accessing various third-party information sources that can provide a variety of types of information about customers and/or items (e.g., credit reports and demographic information for customers, detailed product information about item and their attributes, etc.). Similarly, with respect to factors related to transporting items to return destinations, the system may be able to dynamically obtain relevant information in various ways, such as by accessing various third-party information sources (e.g., transportation carriers to determine typical transportation times and costs, traffic and weather reports to obtain information on current traffic or weather conditions, etc.).

In addition to dynamically determining an appropriate return destination for an item return and/or appropriate routing for the item return, a variety of other types of processing related to item returns may be provided in some embodiments. For example, in some embodiments the system may further facilitate providing refunds and/or replacements to customers, whether immediately (e.g., for customers that are of sufficiently high value or are sufficiently trustworthy) or after the item return is received at the return destination and/or verified. In particular, in some embodiments some or all of the factors previously discussed may be considered at the time when an item is processed at an intermediate location in order to determine whether to immediately provide compensation (e.g., a refund, credit, substitution, etc.), such as based at least in part on a value of or other status of the customer—in this manner, compensation may be provided to the customer before the item return process is completed. More generally, in some embodiments the dynamic orchestration by the system of the return of an item may include not only assisting the customer in sending the item to an intermediate shipping location and in selecting a final return destination, but by further performing other related activities to facilitate the return processing. A variety of other types of return processing can similarly be provided, such as by offering alternative items for items being returned, by offering insurance or other protection related to return processing or for a new or replacement item to be received by the customer, by offering expedited return processing or other services for a fee, by offering to assist the user in selling unwanted items to other customers rather than returning them, etc.

In addition, in some embodiments the handling of an item return at an intermediate location may occur in manners other than shipping an item to a final return destination. For example, in some embodiments a return of an item may involve destruction and/or other disposing of the item in an appropriate manner at the intermediate location, and may optionally further involve the gathering or providing of evidence of the disposal actions. In other situations, item return handling at the intermediate location may include merely providing information to an intended recipient of the item (e.g., a partner of the merchant that provided the item to the customer, a charity or other related organization, etc.), with the recipient then responsible for obtaining the item from the intermediate location. A variety of other similar actions may be taken as part of an item return.

Furthermore, while the system will in some embodiments provide the dynamic item return handling processing for a single organization (e.g., a merchant), such as when executed by that organization, in other embodiments the system may simultaneously provide dynamic processing for a variety of organizations, such as via a fee-based service (e.g., a Web service and/or manual services at intermediate shipping locations) provided to those organizations by a third party.

For illustrative purposes, some embodiments are described below in which particular techniques are described for selecting specific types of return destinations and/or specific types of return routing in specific types of ways for items being returned. However, those skilled in the art will appreciate that the techniques of the invention can be used in a wide variety of other situations, including with non-Web item ordering services, for types of items other than those explicitly discussed, with types of intermediate shipping locations other than those explicitly discussed, with types of in-transit item routing other than at intermediate shipping locations, and for types of item handling other than return processing.

As an illustrative example of techniques for obtaining information about items to be returned, FIGS. 1A-1D provide examples of user interface screens that may be provided to users of a Web-based item ordering service in order to direct items to intermediate shipping locations in such a manner as to assist in dynamically determining appropriate handling of item returns while the items are in transit based at least in part on current conditions. In particular, FIG. 1A illustrates an example user interface screen 100a that an example merchant Web Merchant MMM provides to customers to facilitate returns of items previously provided to the customers by the merchant, such as via a Web page sent to the customers from a Web server of the merchant. In this example, Customer CCC has selected a Returns Center portion of the Web site of Web Merchant MMM, as indicated by current status information 105a, and is in the process of indicating one or more items to be returned.

In this example, information about a prior order 1245 by Customer CCC is shown, as indicated by order information 120, such as based on a prior selection by Customer CCC of that order (not shown) or based on that order being the only prior order that is relevant for the customer (e.g., by having been placed or fulfilled within a prior amount of time for which returns are still allowed, or being the only prior order from the customer)—in other situations, information about multiple orders may instead be displayed simultaneously. In this example, a single copy of each of two items was provided to Customer CCC as part of order 1245, those being items A and B, as shown in item information sections 125 and 130, respectively. The information for each item includes an indication of the item, such as indication 125a for item A, an indication of the quantity of the item to return, such as quantity indication 125b for item A, and an indication of a reason for the item return, such as return indication 125c for item A.

In this example, Customer CCC can indicate a desire to return an item by changing the quantity to return from the default of 0 to being 1 or more of the copies of the item that were ordered, although in other embodiments an indication of a desire to return an item can be made in other ways. In this example, Customer CCC indicates an intention to return his/her copy of item B, and then proceeds to indicate a reason for the return. In particular, in this example the dropdown list 127 indicates various reasons that the customer may supply for an item return, and Customer CCC selects reason 127a in this example to indicate that he/she had ordered the wrong item. In addition to the reasons in the dropdown list, other reasons for the return are indicated in section 110a, in which the customer can indicate that an item was received that was sent to them by mistake, whether instead of or in addition to other items that they received. After Customer CCC indicates the reason 127a, the customer selects the control 135a to continue with the return interaction.

FIG. 1B illustrates an example user interface screen 100b that is displayed to Customer CCC after selection of the "Continue" control 135a in FIG. 1A. As shown in current status information 105b, Customer CCC is now prompted in this example to select the shipping method to be used for the item return, although in other embodiments the customer may not be allowed to select the shipping method. In particular, various shipping options 145 are shown for the item(s) 140 being returned, which in this example include having Customer CCC drop off a package containing item B with the United States Postal Service or the private shipping company UPS at no charge, or opting to pay an additional fee for item pickup. While not illustrated in this example, in other embodiments a customer may further be allowed to specify a variety of other aspects of the item return routing, such as a shipping speed and/or shipping method for a selected shipping carrier.

After Customer CCC selects the default shipping option of using the United States Postal Service in FIG. 1B and indicates to continue, a user interface screen 100c is displayed to Customer CCC in FIG. 1C that includes a shipping label 150 to be used for the return. FIG. 1C also includes instructions 151 that indicate to print the screen and then cut out the shipping label for use with a package containing the item being returned, and various additional instructions 167 related to the item return process are also illustrated to Customer CCC in user interface screen 100d of FIG. 1D, whether as part of a single display to Customer CCC along with screen 100c or instead in subsequent displays. The additional instructions indicate to affix the shipping label externally to the package containing the item B, and FIG. 1D further provides summary information 165 regarding the item return, such as to display an RMA number that has been assigned to this item return by the merchant. While not illustrated here, in some embodiments the provided shipping label could further be automatically customized for the customer, such as to include the customer's name and shipping location in the "From:" section of the label.

In this example, Web Merchant MMM is employing a specialized parcel select return service of the United States Postal Service for use with this item return, with the item to be directed to a specified Bulk Mail Center for retrieval by Web Merchant MMM, and with the shipping costs to be billed to the merchant—in other embodiments, the customer may need to pay the shipping costs themselves, and receive reimbursement from the merchant when appropriate. However, in this example, since the item return is not the result of an error on the part of the merchant, Customer CCC is informed in section 110c that shipping costs associated with the return are the responsibility of the customer, such as to be deducted from the refund that the customer will receive. In this example, the Bulk Mail Center selected for use as the intermediate shipping location for the item return from Customer CCC is the local Bulk Mail Center that serves the geographic area in which Customer CCC is located. The example shipping label includes information 150a related to the merchant, including the merchant's name 150c and a previously obtained permit number 150b corresponding to the specialized parcel return service—this information will be used at the selected Bulk Mail Center to identify the recipient who is to retrieve the item return package from the Bulk Mail Center. The shipping label also includes a section 153 indicating the Bulk Mail Center to which the item return package will be directed, and a bar code and related information 154 for use by the USPS in sending the package to the selected Bulk Mail Center (e.g., to include a zip code associated with that Bulk Mail Center).

In addition, in this example Web Merchant MMM further includes additional information 160 as part of the shipping label for its own use, as indicated at 160a. In this example, the additional information includes an alphanumeric code 160b and a bar code 160c, which can be used to encode a variety of types of information that may be of use at the intermediate shipping location and/or the final return destination (e.g., an RMA or other tracking number related to the item return, an encoding of information about the items being returned and/ or reasons for return, an encoding of return processing instructions for use at the intermediate shipping location and/ or return location, such as types of activities to perform and/or an ultimate destination to which the item return package should be forwarded, etc.). In other embodiments, similar types of information may be provided to a customer for inclusion with the contents of an item return package. However, by providing the information on the shipping label on the exterior of the package in this example embodiment, operators at the intermediate shipping location and/or the final return destination can quickly obtain information related to how to handle the item return package, such as by scanning the bar code. Thus, for example, a portable computing device used by a representative of Web Merchant MMM at the selected Bulk Mail Center can use quickly obtain information about an item package that has been received, dynamically determine an appropriate final return destination (whether alone or in conjunction with one or more remote computing systems with which the portable device is in communication), and provide information to the operator to assist in directing the item package from the Bulk Mail Center to the determined final return destination.

Thus, after Customer CCC packs item B in a package to be returned, affixes the shipping label, and provides the package to the appropriate shipping service, the item return package will be obtained in this example at the intermediate shipping location and will be processed in a manner that is dynamically determined by Web Merchant MMM while the item package is in transit.

In the example illustrated in FIG. 1C, a specialized parcel return service of the USPS was used to assist in the dynamic disposition determination processing. In other embodiments, however, a variety of other techniques could instead be used for this purpose. For example, in some embodiments Web Merchant MMM may be assigned one or more unique zip codes by the USPS (e.g., with each zip code associated with a physical location of the merchant), with any packages sent to those zip codes identifying the merchant as the indicated recipient. If so, a shipping label provided to a customer for an item return (e.g., interactively in a manner similar to that illustrated in FIG. 1C, or prospectively before a determination is made that an item is to be returned) may include that zip code for that merchant, and any item package with such a shipping label from a customer would be initially forwarded to a local Bulk Mail Center for processing. However, rather than having the USPS transport the item package to the physical location of the merchant that is associated with the zip code, the merchant may instead arrange to periodically retrieve such packages from each of the Bulk Mail Centers (e.g., for a reduced fee from the USPS, item packages would only need to be transported to and handled by the USPS at the local Bulk Mail Center). In a manner similar to that previously described, any such packages retrieved by a representative of the Web merchant from a Bulk Mail Center could then be identified and forwarded from that Bulk Mail Center to a dynamically selected final return destination. Various functionality provided by various third-party private shipping companies could similarly be used in a corresponding manner, as well as other types of functionality and/or facilities of the USPS or other governmental shipping organization.

In some embodiments, such as when using zip codes to direct item return packages to the merchant, the merchant may instead not make any selection of a particular intermediate shipping location, instead merely specifying the zip code in that example and allowing the USPS to transport the item package to any of the Bulk Mail Centers—thus, the merchant may not even know the intermediate shipping location at which an item return package will appear, instead performing the dynamic disposition determination processing for whatever item return packages happen to be retrieved from an intermediate shipping location. Alternatively, in other embodiments the merchant may not only select an intermediate shipping location for an item return, but may further perform some or all of the dynamic disposition determination processing for an item before the item arrives at that intermediate shipping location (e.g., printing a shipping label directed to a final return destination for an item package before retrieving the item from its intermediate shipping location, and then transporting the shipping label to the intermediate shipping location at which the item will arrive).

In other embodiments, a variety of other types of shipping labels could be generated, including for use with other shipping carriers or services (e.g., private shipping company United Parcel Service, or "UPS"). In addition, while not illustrated here, a merchant's Web site or other interactive mechanism could further provide a variety of other types of information and services to customers in other embodiments. For example, before receiving user interface screen 100a in FIG. 1A, a customer could initially receive a user interface screen that provides various information about prior orders by the customer, such as to allow selection of an order having an item to be returned. In addition, the customer could be queried as to whether the item being returned was ordered by the customer or instead received as a gift, and various other types of information for gift items being returned could further be gathered. Similarly, the customer could be queried in at least some circumstances as to whether they would like to receive a refund or a replacement. In addition, for at least some items being returned (e.g., those for which only a partial or no refund is available), the customer could be queried as to whether they would like to list the item for sale to other customers. For situations in which a customer has mistakenly received an item, the customer could be queried as to whether they would like to keep the item, such as at a discount (e.g., a discount based on the cost to the merchant of performing return processing for the item if it is returned). Also, when providing a shipping label and/or other information related to performing the item return, such information could instead be provided to the customer in other ways, such as via fax or email. Finally, after a customer has initiated one or more item returns, information related to the returns can be provided to customers in various ways, such as to indicate the status of returns and the cumulative amount of refunds received as part of summary information provided to the customer that is related to the customer's prior activities.

Figure 2:
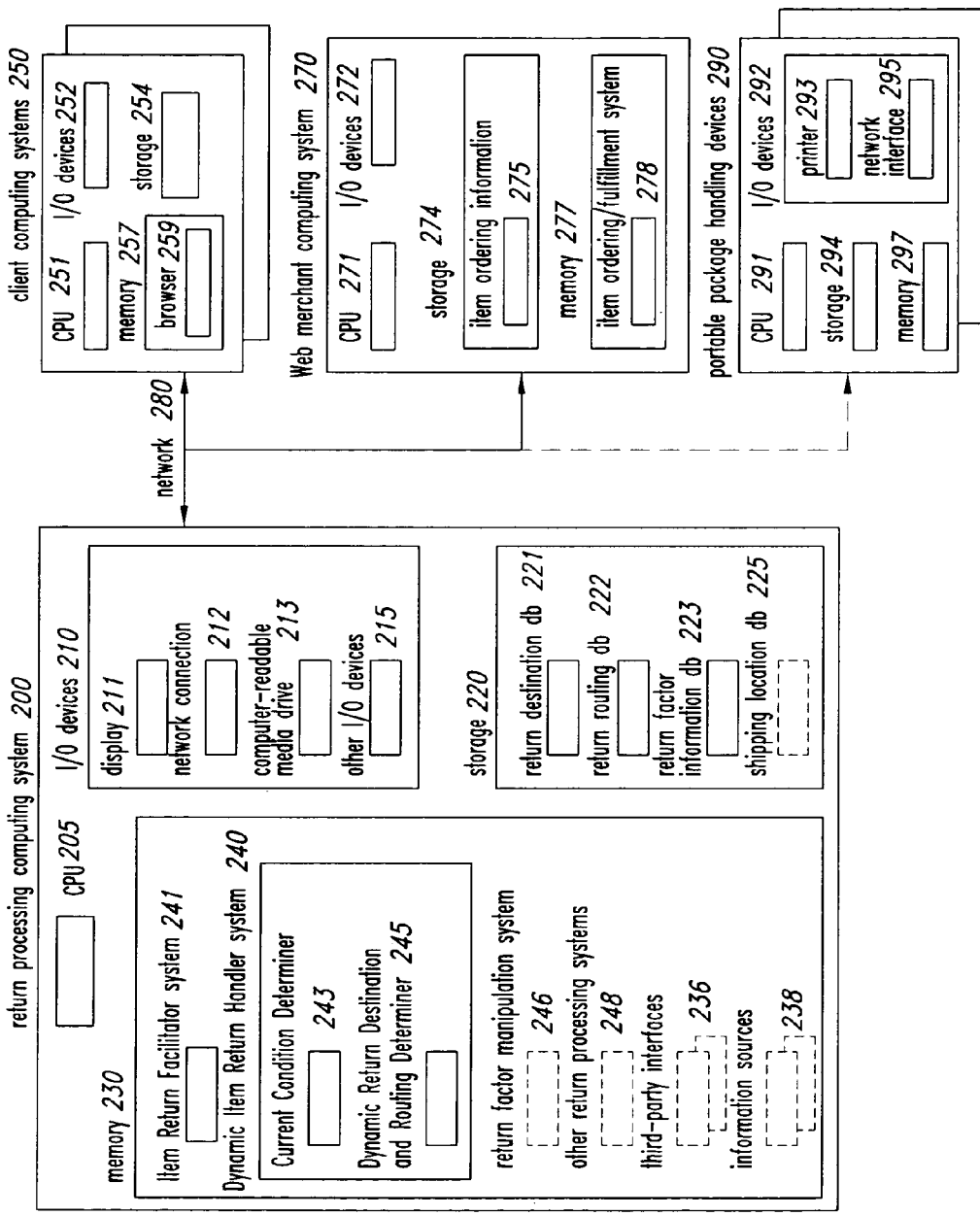
FIG. 2 is a block diagram illustrating an embodiment of a system for dynamically determining appropriate handling of item returns based at least in part on current conditions.

FIG. 2 illustrates a return processing computing system 200 that is suitable for executing an embodiment of a Dynamic Item Return Handler ("DIRH") system that performs dynamic item return handling processing for item returns while they are in transit, as well as one or more portable package handling devices 290 for use in processing the in-transit item returns in order to facilitate the dynamic disposition determination processing. In addition, FIG. 2 illustrates one or more client computing systems 250 with which users can interact with an Item Return Facilitator ("IRF") system that provides information to the users to cause the items to be directed to intermediate shipping locations, and a Web merchant computing system 270 with which the return processing system 200 can programmatically interact.

In this example embodiment, the Web merchant computing system performs order processing activities for the merchant, and the return processing system 200 performs activities on behalf of the merchant to facilitate return processing.

In the example embodiment, the computing system 200 includes a CPU 205, various input/output ("I/O") devices 210, storage 220, and memory 230. The I/O devices include a display 211, a network connection 212, a computer-readable media drive 213, and other I/O devices 215. An embodiment of the IRF system 241 is executing in memory 230, where it receives information about items to be returned and assists in having the item returns sent to appropriate intermediate shipping locations. Indications that one or more items are to be returned can be received by the IRF system in various ways, such as from customers at client computing systems. In such situations, the system interacts with the customers to obtain information about the item returns, such as by providing Web pages to a browser 259 executing in memory 257 of the client computing system being used by the customer. Furthermore, the system may in some embodiments further gather and use various other information when interacting with the customers, such as by interacting with the Web merchant computing system to access stored item ordering information 275 on storage 274 (e.g., information about previous orders and/or about customers). The IRF system then provides information to the customer to be used in returning the item, which in some embodiments may include provided information that indicates to send the item to an appropriate intermediate shipping location that was selected by the system. In such embodiments, the IRF system may first identify potential intermediate shipping locations for the return, such as based on information from an optional shipping location database 225 on storage 220, and then select one of the potential intermediate shipping locations based on one or more of various criteria (e.g., a location of the customer). In other embodiments, the IRF system could instead obtain at least some information about potential intermediate shipping locations from an external computing system, such as the Web merchant computing system.

In other embodiments, the IRF system may assist in having item returns sent to intermediate shipping locations without explicitly selecting those intermediate shipping locations. For example, in some embodiments the IRF system may retrieve a destination indicator that is associated with a merchant and/or destination location (e.g., a zip code assigned to and associated with a merchant by the USPS, a delivery address for a location, etc.), provide that destination indicator to the customer for use in indicating the item return destination, and allow a third-party shipping operation or other transportation company to direct the item return to an intermediate shipping location selected by the third-party shipping operation based on that destination indicator (e.g., based on a location of the customer and/or a location associated with the destination indicator).

An embodiment of a DIRH system 240 is also executing in memory 230, and in this example embodiment it includes a Current Condition Determiner component 243 and a Dynamic Return Destination and Routing Determiner component 245. The DIRH system receives information about items to be returned, and dynamically determines an appropriate return destination and/or return routing for an item return while the item return is in transit. In other embodiments, the DIRH system could further dynamically determine a variety of additional types of activities to be performed for items being returned while the item returns are in transit.

The dynamic return handling functionality of the DIRH system is initiated when it receives an indication that one or more items are to be returned, such as an indication received from an operator using a portable package handling device at an intermediate shipping location where the item is located. In such situations, the DIRH system interacts with the operators to obtain information about the item returns (e.g., current location and condition of the item return), such as by exchanging information with a package handling device (e.g., via a wireless connection) being used by the operator that was acquired from a package containing the item (e.g., based on an external shipping label on the package). In some embodiments, the system may gather and use various information when interacting with the operators, such as by interacting with the Web merchant computing system to access stored item ordering information 275 related to the item and its return (e.g., information about the prior order for the item and/or about the customer performing the return). After the item-related information is obtained from the operator, the DIRH system then identifies potential return destinations for the return and/or potential return routing options for the return, such as by obtaining information from a return destination database 221 and return routing database 222 on storage 220, although in other embodiments the DIRH system could obtain at least some such information from the Web merchant computing system.

As part of the dynamic selection of the final return destination by the DIRH system, the DIRH system further obtains information about relevant factors that may influence the choice of which return destination and/or return routing option to dynamically select, such as based on return factor information in database 223 of storage 220. The Current Condition Determiner component obtains information about current values for various factors with respect to the various return destinations and return routing options, such as based on current conditions relevant to those factors. Such current condition information can be obtained in a variety of ways, such as by accessing optional information sources 238 executing in memory 230 or elsewhere and/or by using optional third-party interfaces 236 to obtain information from other remote systems (e.g., to obtain information about distribution centers of the merchant from the Web merchant computing system, or to obtain information about shipping options from computing systems for third-party shippers).

After current factor information is available for the various return destination options, the Dynamic Return Destination and Routing Determiner component evaluates the return destinations and return routing options with respect to the factors, such as by using current weight information for the factors from the return factor information database in order to generate weighted scores. The component then selects one or more of the return destination options and/or return routing options with the highest evaluations for use as part of the item return processing. The DIRH system may then provide information to the operator regarding the determined return destination(s) and/or return routing option(s), such as by sending information (e.g., a new mailing label) to a package handling device of the operator to re-direct the package to a single automatically selected return destination using a single automatically selected type of return routing, or instead by providing information to the operator to allow them to select between multiple return destination and/or return routing options.

In addition, in the illustrated embodiment an optional return factor manipulation system 248 is also executing in memory 230, such as to allow administrative users to dynamically configure how various factors influence the evaluation process during the dynamic item return handling processing. For example, administrative users representing the Web merchant can access the manipulation system 248 from a client computing system 250 or other computing system in order to modify weights assigned to factors and/or otherwise manipulate which factors are relevant for corresponding return destinations, return routing options and/or other types of return processing, including for item returns that are already in transit but for which final return destinations have not yet been selected.

In this example embodiment, one or more other return processing systems 232 may also optionally be executing in memory 230, such as to facilitate item return processing in coordination with the DIRH system. For example, such other return processing systems may notify return destinations of item return packages to be expected and of associated processing to be performed for those packages, and may further perform refund processing on behalf of customers after item returns are processed.

In other embodiments, the DIRH system and other return-related systems may be integrated with the ordering and/or fulfillment systems of a single merchant (e.g., item ordering and fulfillment system 278 executing in memory 277 of the Web merchant computing system), such as to support only the operations of that merchant, or alternatively the DIRH system and other return-related systems may instead provide return processing functionality for multiple distinct merchants, such as part of a fee-based service (e.g., by providing a programmatic API to those merchants, such as based on Web services).

Those skilled in the art will appreciate that computing systems 200, 250, 270 and 290 are merely illustrative and are not intended to limit the scope of the present invention. Computing system 200 may be connected to other devices that are not illustrated, including through one or more networks such as the Internet or via the World Wide Web ("Web"). More generally, the illustrated computing systems and package handling devices may comprise any combination of hardware or software that can interact, including desktop or other computers, network devices, PDAs, cellphones, cordless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated DIRH system components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components may execute in memory on another device and communicate with the illustrated computing system via inter-computer communication. Some or all of the DIRH system components or data structures may also be stored (e.g., as software instructions or structured data) on a computer-readable medium, such as a hard disk, a memory, a network, or a portable media article to be read by an appropriate drive or via an appropriate connection. The DIRH system components and data structures can also be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 3:
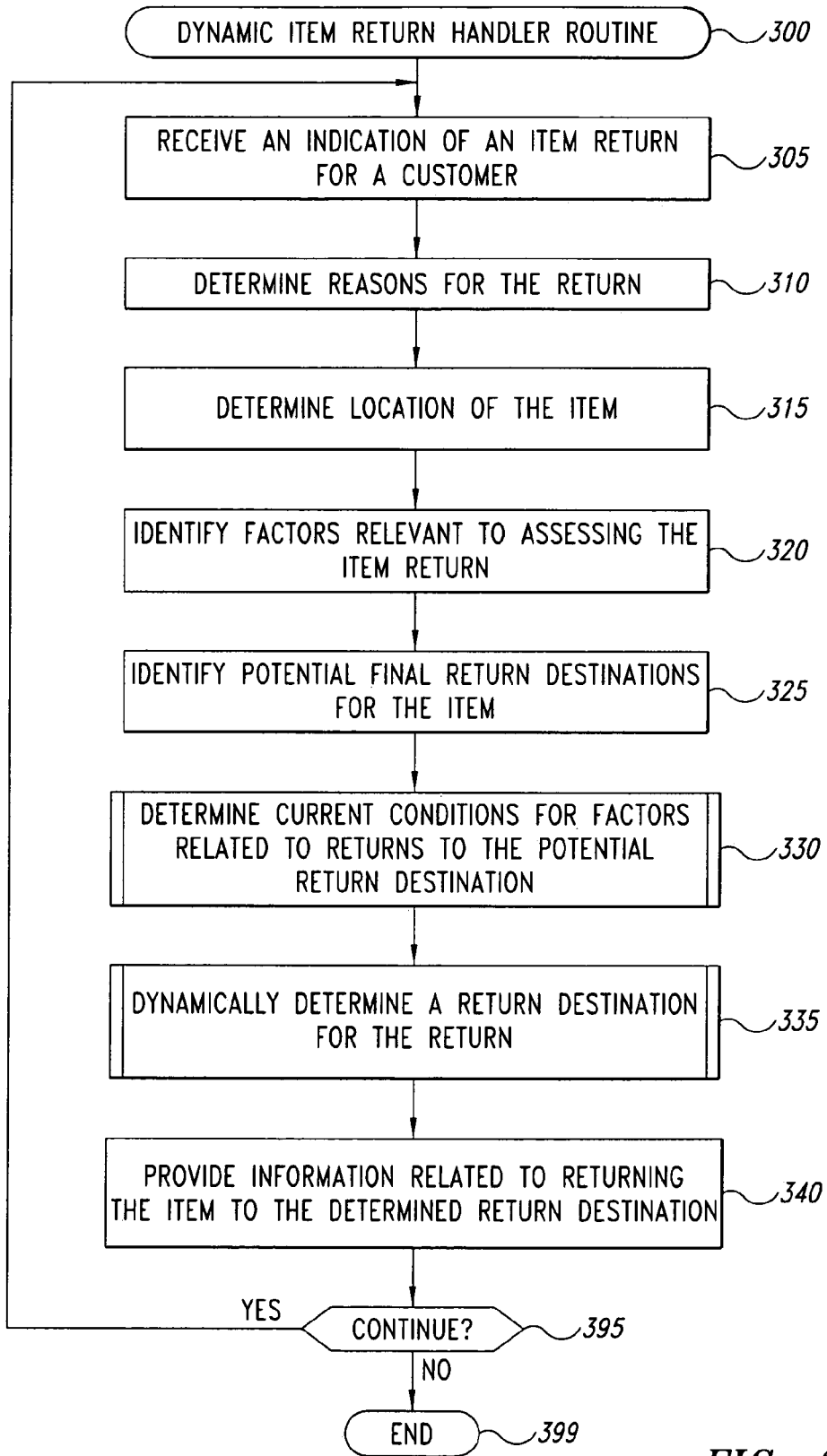
FIG. 3 is a flow diagram of an embodiment of a Dynamic Item Return Handler routine.

FIG. 3 is a flow diagram of an embodiment of a Dynamic Item Return Handler routine 300. The routine may, for example, be provided by execution of an embodiment of the DIRH system 240 of FIG. 2. In this illustrated embodiment, the routine receives indications of items to be returned, and dynamically determines how to handle the returns of those items while the item returns are in transit, such as by dynamically selecting a final return destination to which those items are to be returned. While not illustrated in this embodiment, in other embodiments the routine may dynamically select a type of return routing to be used as part of the item return, whether instead of or in addition to dynamically selecting a final return destination.

The routine begins in step 305, where an indication is received of an item being returned from a customer, such as an indication received from an operator at an intermediate shipping location. The routine continues to step 310 to determine reasons for the return and in step 315 to determine a current location of the item, such as via interactions with the operator, based on information received in step 305, and/or based on stored information (e.g., information previously received from the customer). In step 320, various factors are then identified that are relevant to assessing appropriate return processing for the item, and in step 325 the routine identifies potential final return destination locations for the item, such as by retrieving stored indications of the factors and return destinations. The routine then continues to execute subroutine 330 to determine current conditions for at least some of the factors related to the potential return destinations. The routine then continues to execute subroutine 335 to dynamically determine an appropriate final return destination for the item based on the factors and current conditions, and continues to step 340 to provide information (e.g., to the operator) that is related to returning the item to the determined return destination, such as a new shipping label. Information associated with the package can then be modified to direct the item to the determined return destination, such as by the operator modifying the package to include a new shipping label; by modifying information external to the package (e.g., automatically or by the operator) that will control how and/or where the package is sent, such as information associated with a bar code or other identifier for the package (e.g., an RFID tag); etc. While not illustrated here, in some embodiments the routine may further interact with the customer for various reasons, such as to provide information about options to the customer and allow the customer to specify how aspects of the item return handling are to occur.

After step 340 the routine continues to 395 to determine whether to continue. If so, the routine returns to step 305, and if not continues to step 399 and ends. While not illustrated here, a variety of other types of item return processing could similarly be dynamically and automatically determined, including specific types of handling for an item return (e.g., to verify authenticity of the item), and to provide refunds or replacements to customers as appropriate.

Figure 7:
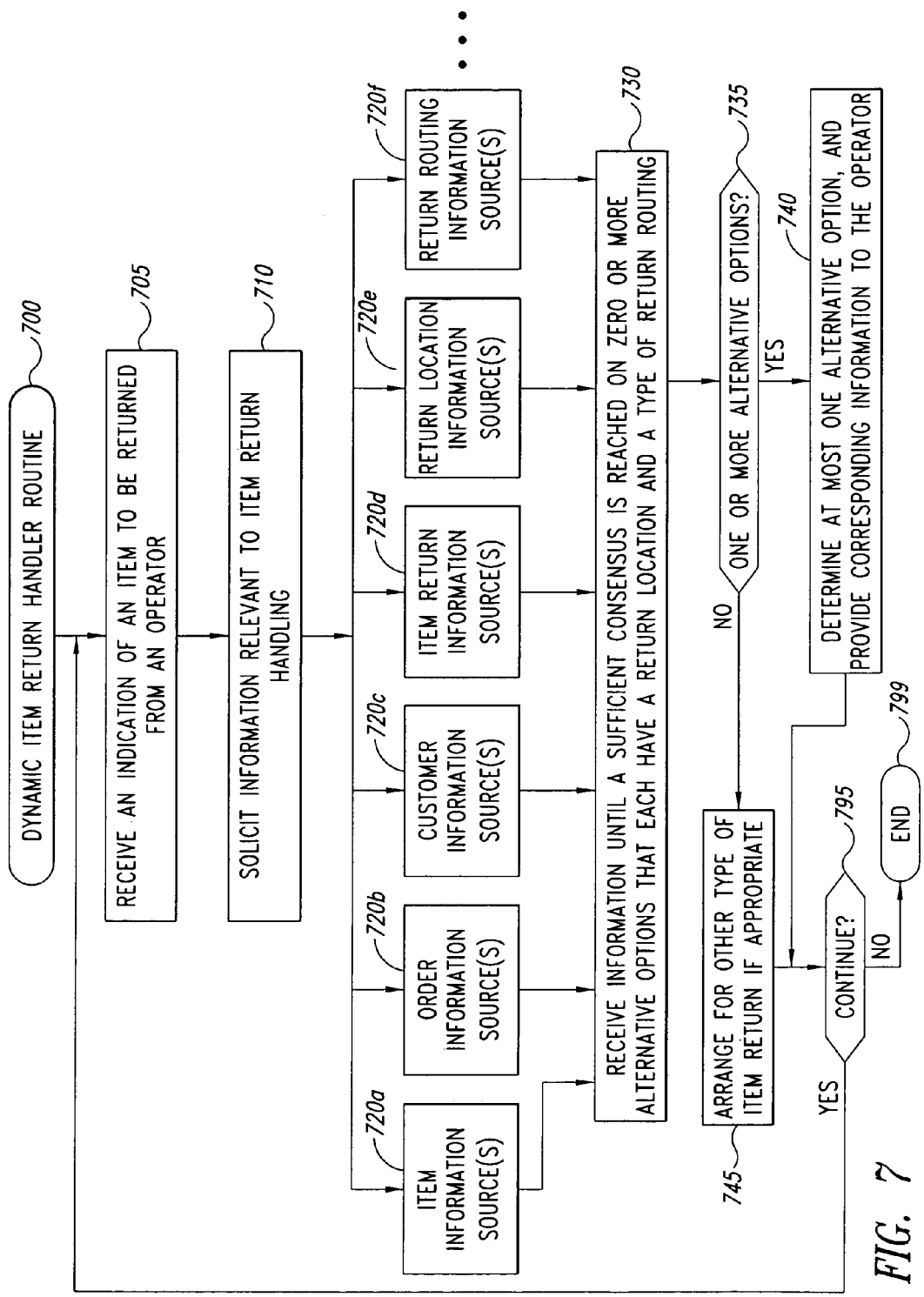
FIG. 7 is a flow diagram of an alternative embodiment of the Dynamic Item Return Handler routine.

In addition, while the embodiment illustrated in FIG. 3 illustrates a specific example series of steps that are performed, in other embodiments some or all of the illustrated actions may instead be performed in other orders and/or in other ways. For example, as discussed in greater detail below, FIG. 7 illustrates an alternative embodiment of the Dynamic Item Return Handler routine in which the item return handling processing is performed in an alternative manner.

Figure 4:
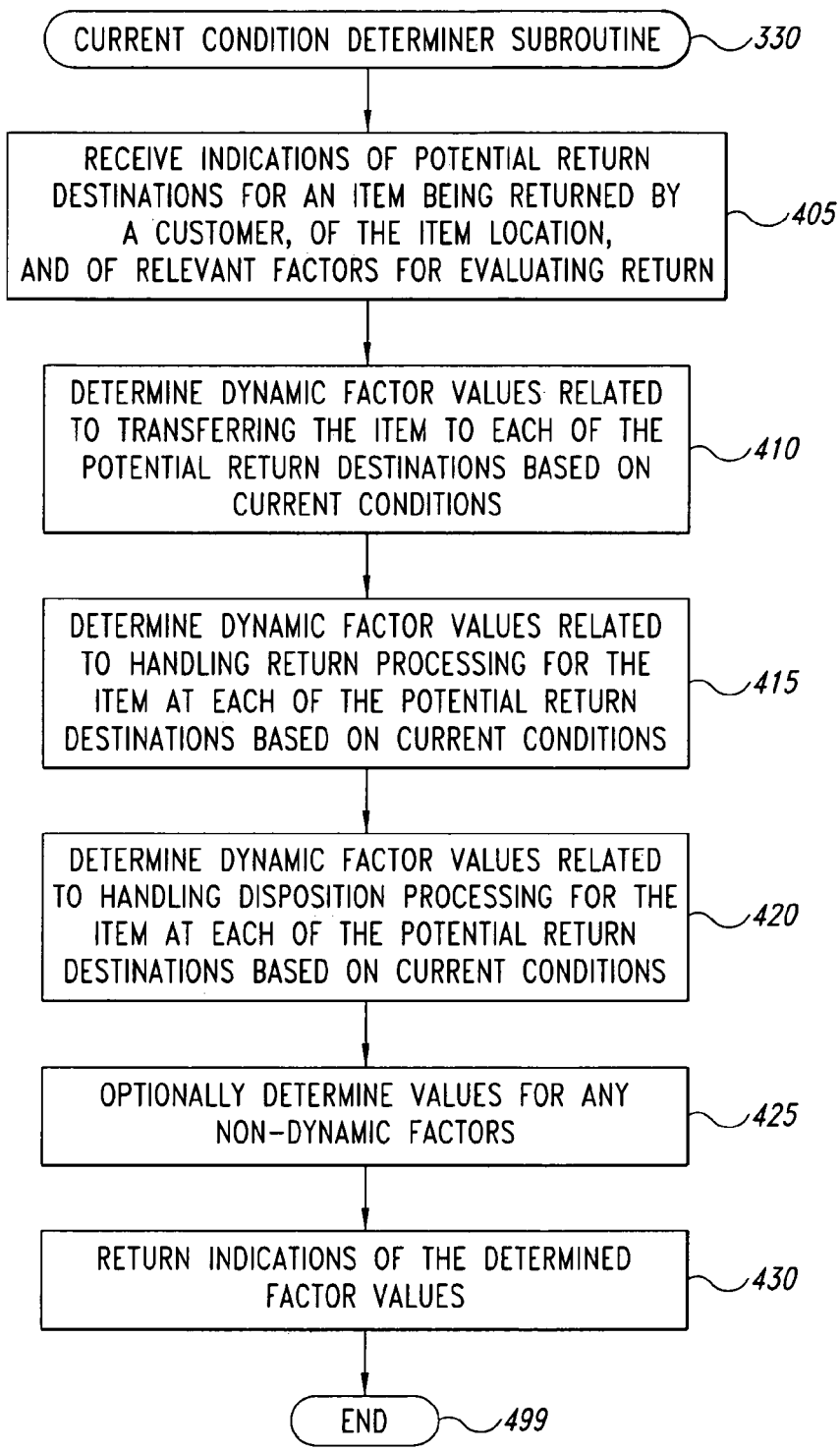
FIG. 4 is a flow diagram of an embodiment of a Current Condition Determiner subroutine.

FIG. 4 illustrates an embodiment of a Current Condition Determiner subroutine 330. The subroutine may, for example, be provided by execution of an embodiment of the Current Condition Determiner component 243 of FIG. 2. In this illustrated embodiment, the subroutine receives information about potential final return destinations for an item return and various factors relevant to the item return, and determines values for the factors for the return destinations based at least in part on current conditions.

The subroutine begins in step 405, where indications are received of potential final return destinations for an item being returned from a customer, of the location of the item, and of various factors relevant to evaluation of the potential return destinations. While not illustrated here, in other embodiments the information to be evaluated could more generally be various plans that include not only return destinations but additional information related to return routing options and/or other information about how items are to be transferred to their return destinations, specific types of processing to be performed at the return destinations, and/or additional disposition activities after the return processing is completed. In addition, in some embodiments additional types of information could be received and used when determining information about current conditions, including information about the customer who is returning the item.

The subroutine next continues to step 410 to determine values based on current conditions for dynamic factors that are related to transferring the item to each of the potential return destinations, such as factors relevant to cost and time in transporting the items (e.g., weather conditions, traffic conditions, shipping service conditions, etc.)—in some embodiments, various return routing options may more generally be considered. In step 415, the subroutine then determines values based on current conditions for dynamic factors that are related to performing return processing for the item at each of the potential return destinations, such as based on capabilities and current item handling capacities (e.g., storage and labor) at the return destinations. In step 420, the subroutine then determines values based on current conditions for dynamic factors that are related to handling disposition processing for the item at each of the potential return destinations after the return processing is completed, such as based on capabilities and capacities at the return destination for performing the final disposition, as well as any need or desire for the item (e.g., to supplement low inventory levels or low work load levels). The disposition processing after the return processing may include, for example, sending the item to another destination (e.g., to send the item to another customer to fulfill a current order from that other customer for the item).

If there are any non-dynamic factors whose values vary rarely if at all, and thus are not typically based on current conditions, the subroutine obtains information about values for those factors in step 425, such as by retrieving the corresponding information from databases or other information sources. The system then continues in step 430 to return indications of the determined values for the factors, and ends in step 499. As discussed elsewhere, information about current conditions can be obtained and assessed in a variety of ways, including by obtaining information from a merchant on whose behalf the return processing is being performed and/or obtaining information from other relevant third-party information sources.

Figure 5:
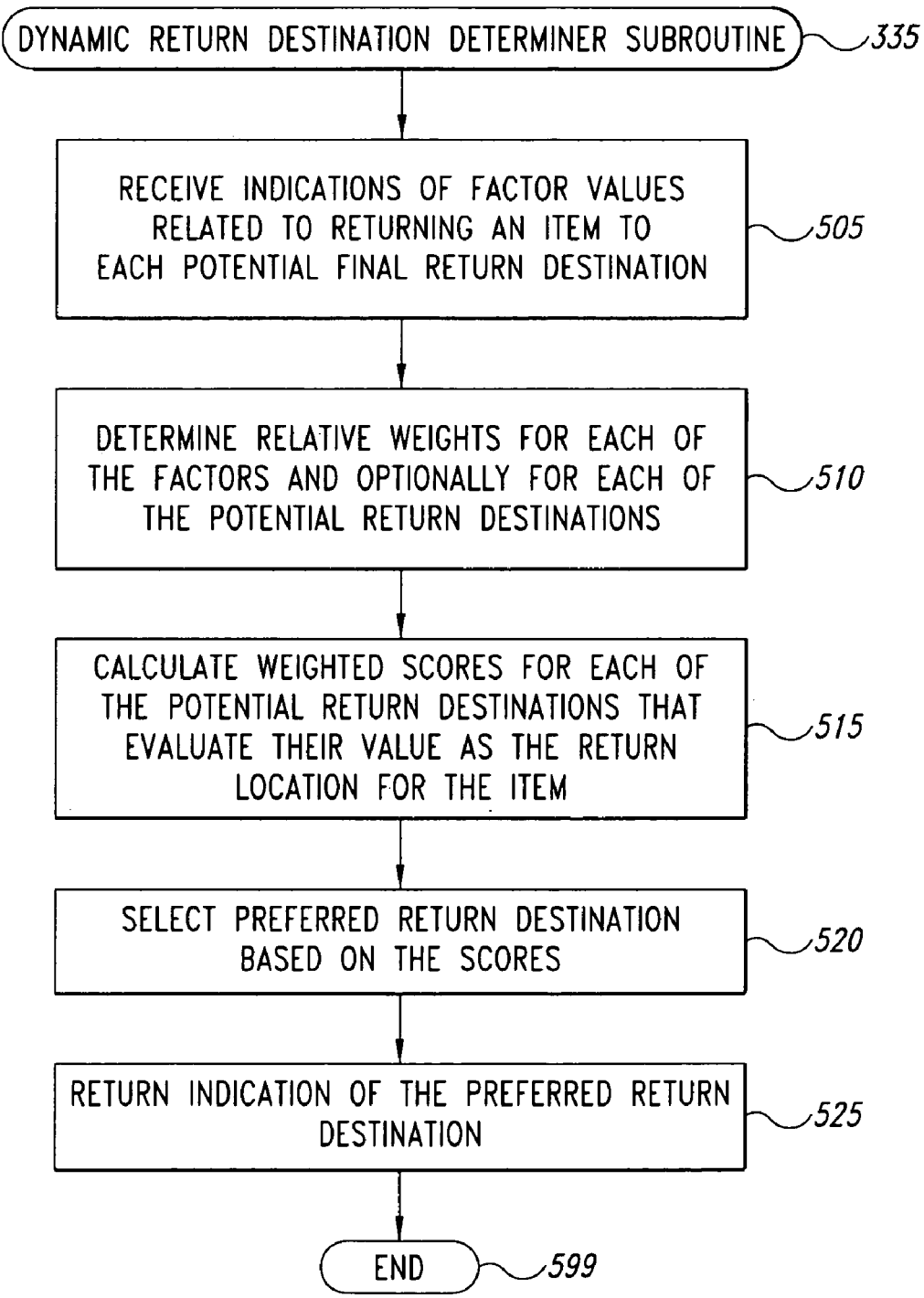
FIG. 5 is a flow diagram of an embodiment of a Dynamic Return Destination Determiner subroutine.

FIG. 5 illustrates an embodiment of a Dynamic Return Destination Determiner subroutine 335. The subroutine may, for example, be provided by execution of an embodiment of the Dynamic Return Destination and Routing Determiner component 245 of FIG. 2. In this illustrated embodiment, the subroutine receives information about final return destination options for an item return and values for various factors relevant to evaluating the return destinations, and dynamically determines the return destination with the highest evaluation based on the factor values.

The subroutine begins at step 505, where indications are received of factor values based at least in part on current conditions that are related to returning an item from a customer to each of multiple possible return destinations. In step 510, the subroutine then determines relative weights for each of the factors to be used in assessing their relevance during the evaluation, as well as optionally receiving weighting information specific to one or more of the return destinations (e.g., to express a preference for one or more of the return destinations independent of the other factors)—by retrieving the weight information dynamically, any user-modifications or configurations of the weight information for the factors can be rapidly incorporated into the evaluation process. The subroutine then continues at step 520 to calculate weighted scores for each of the possible return destinations to represent the value to the merchant on whose behalf the return processing is being performed of using that return destination for the item return, and in step 525 selects the preferred return destination based on the calculated scores (e.g., the return destination with the highest evaluation). In step 530, the subroutine returns an indication of the selected preferred return destination, and in step 599 ends. While not illustrated here, in some embodiments the subroutine may rank multiple return destinations relative to each other and provide information about multiple return destinations and their relative rankings, such as to allow preference information (e.g., that of the merchant and/or the customer) to be manually or automatically obtained and used in selecting the return location.

Figure 6:
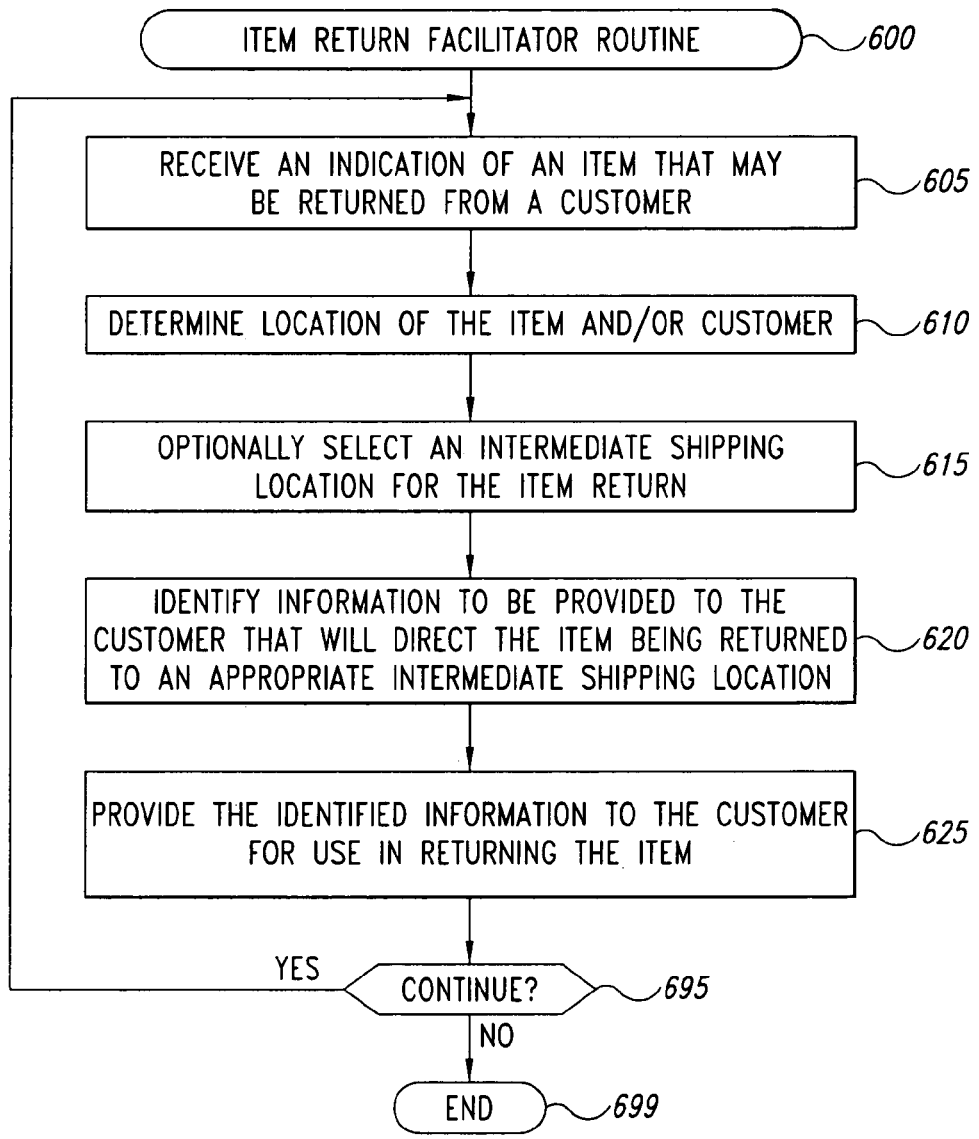
FIG. 6 is a flow diagram of an embodiment of the Item Return Facilitator routine.

FIG. 6 is a flow diagram of an embodiment of an Item Return Facilitator routine 600. The routine may, for example, be provided by execution of an embodiment of the IRF system 241 of FIG. 2. In this illustrated embodiment, the routine receives indications of items to be returned, such as from customers, and assists in directing the items being returned to appropriate intermediate shipping locations for dynamic disposition processing.

The routine begins in step 605, where an indication is received of an item to be returned from a customer, such as an indication received from the customer. The routine continues to step 610 to determine a current location of the item and/or the customer, such as via interactions with the customer and/or based on information received in step 605. In step 615, an appropriate intermediate shipping location for the item return is optionally selected, such as based on the location of the item and/or customer, although in other embodiments additional information may be used in the selection (e.g., information about current conditions for a variety of factors used to evaluate appropriateness of multiple intermediate shipping locations), or instead a particular intermediate shipping location may not be selected. The routine then continues to step 620 to identify information to provide to the customer to direct the item to an appropriate intermediate shipping location, such as an intermediate shipping location selected in step 615—the identified information may include a variety of forms, such as a zip code associated with a merchant and/or an address associated with a particular intermediate shipping location. The routine then continues to step 625 to provide to the customer the identified information to assist in returning the item to an appropriate intermediate shipping location, such as by including the identified information as part of a shipping label sent to the customer. After step 625 the routine continues to 695 to determine whether to continue. If so, the routine returns to step 605, and if not continues to step 699 and ends.

FIG. 7 is a flow diagram of an alternative embodiment of the Dynamic Item Return Hander routine. The routine may, for example, be provided by execution of an embodiment of the DIRH system 240 of FIG. 2. In this illustrated embodiment, the routine 700 receives indications of items to be returned, and dynamically determines how to handle the returns of those items, such as by dynamically selecting a final return destination to which those items are to be returned and dynamically selecting a type of return routing to be used as part of the item return. In contrast to the embodiment of the Dynamic Item Return Handler routine illustrated in FIG. 3, the embodiment illustrated in FIG. 7 attempts to obtain in parallel various types of information related to item return handling, and proceeds with the item return handling processing as soon as sufficient information is received to make a determination regarding how the item return handling is to be performed.

The routine begins in step 705, where an indication is received of an item to be returned from a customer, such as an indication received from an operator at an intermediate location at which the item has been received while in transit as part of the item return. The routine continues to step 710 to solicit information relevant to a current item return handling decision, such as information related to some or all of the previously discussed factors that may be considered during a dynamic item return handling determination. In particular, in the illustrated embodiment the routine attempts to obtain information in parallel from a variety of a types of information sources 720, including one or more sources of information 720*a* about the item being returned, one or more sources of information 720*b* about the order for which the item was previously provided to the customer, one or more sources of information 720*c* about the customer, one or more sources of information 720*d* about the current item return, one or more sources of information 720*e* about potential final return destinations for the item return, and one or more sources of information 720*f* about potential types of item return routing, as well as optionally one or more sources of other types of information (not shown).

As examples, the item, order and customer information sources may include one or more systems of a merchant that originally provided the item to the customer as part of an order. Examples of item return information sources may include one or more mechanisms by which information is received from the operator regarding the item and/or by which information is received the customer, including via a Web site, phone, email, instant messaging, fax, etc. In addition, examples of final return destination information sources and/or return routing type information sources include one or more systems of a merchant that originally provided the item to the customer as part of an order (e.g., to determine return destinations associated with the merchant) and/or one or more systems of shipping carriers (e.g., to determine types of return routing that are available). Moreover, the obtaining of information from the information sources can be performed in various ways in various embodiments, including by retrieving stored information from an appropriate data store, requesting another component or system (whether local or remote) with access to the information to send it (e.g., by invoking a Web service or other API mechanism of the component or system), interacting with one or more users (e.g., the customer), etc.

In addition, as previously noted, the information received from the various information sources can include a variety of types of factors related to the dynamic item return handling determination, with the types of factors varying in different embodiments. In addition, each information source may be able to provide information for one or more of the types of factors, and may provide different types of information for different types of items and/or at different times. Examples of types of factors for which information may be received and used in some embodiments include a reason for the item return, a location of the item and/or customer, various attributes of the item (e.g., the weight, value, product line, whether it is hazardous or has other restrictions related to its transportation, etc.), various information about the customer (e.g., a value or other status of the customer to the merchant; a level of reliability or trust in the customer, such as based on past interactions with the customer; etc.), various information about the order (e.g., any discounts or rebates given to the customer based on the item being returned), information about potential final return destinations (e.g., indications of demand for the item and capacity to handle the item return at an item distribution return destination), information about potential types of item return routing (e.g., available shipping carriers; available types of shipping speed; available shipping modes; available shipping paths; and various types of shipping methods, such as that affect shipment tracking, delivery verification, payment collection, insurance coverage, and specialized types of handling), etc.

As information is obtained from the various information sources 720, the information is received in step 730 and dynamically evaluated. In the illustrated embodiment, once a sufficient amount of information is received to determine how the item return may be handled, the routine continues to step 735 without requiring that all types of information have been received, although in other embodiments such evaluation processing may be performed in other manners. For example, if information is obtained in the illustrated embodiment that indicates that an item return is sufficiently likely to be fraudulent, the routine may determine one or more alternatives for handling the item return on that basis—such a determination of a likelihood of fraudulence may be made in various ways, such as solely based on information about the customer, solely based on information about the prior order, solely based on information about the item, or based on a combination of information of various types.

The evaluation of the various types of information and the determination of when sufficient information has been received may also be performed in various ways in various embodiments. For example, in some embodiments one or more factors may be sufficiently important that they are required for the evaluation. Alternatively, in some embodiments each factor may be weighted (whether in a static manner or based on weighting information that is dynamically retrieved for each item return), and a threshold may be selected such that a sufficient cumulative weighted value for the received factor information will be used to determine that sufficient information has been received. A variety of other types of logic could be used to perform the evaluation in various embodiments, and various types of techniques for combining and/or evaluating information may be used (e.g., probabilistic reasoning, neural networks, fuzzy logic, decision trees, etc.).

In step 735, the routine receives an indication from the evaluation process in step 730 of zero or more alternatives that have selected for the item return handling, with each of the alternatives in the illustrated embodiment including an indication of a final return destination and one or more types of return routing. The routine determines in step 735 whether at least one alternative was received, and if not continues to step 745 to attempt to arrange for some other type of item return. For example, if having the item transported to a final return destination is undesirable, one of a variety of other types of alternatives for the item return may instead be selected (e.g., discarding or destroying the item; instructing that the item be made available to a third party, such as a charity; etc.). If another item return alternative is determined, the routine provides corresponding information to the operator in step 745 to facilitate that item return processing, and otherwise may provide information to the operator that no further item return handling is to be performed.

If it was instead determined in step 735 that at least one alternative having a final return destination and return routing was received, the routine continues to step 740 to determine at most one of those alternatives to be used for the item return. For example, if only one alternative was received, the routine may in some embodiments and situations automatically determine that the one alternative be used, while in other embodiments and situations the determination may be performed in other manners (e.g., by querying the operator, the customer and/or a representative of the merchant whether that one alternative should be used). Similarly, if multiple alternatives are received, a determination of zero or one of the alternatives can be performed in various manners, such as by querying an appropriate user for a selection and/or preference information, automatically evaluating the alternatives in various ways, etc. If an item return alternative is determined, the routine provides corresponding information to the operator to facilitate that item return processing (e.g., a new shipping label), and otherwise may provide information to the operator that no item return is to be performed.

After steps 740 or 745, the routine continues to step 795 to determine whether to continue. If so, the routine returns to step 705, and if not continues to step 799 and ends.

Those skilled in the art will also appreciate that in some embodiments the functionality provided by the routines discussed above may be provided in alternative ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for dynamically routing items being returned from customers to appropriate final return destinations while the items are in transit, the method comprising:
    for each of multiple customers of an online merchant,
        shipping an ordered item to the customer from an item distribution center of the merchant; and
        providing information to the customer for use in returning the item, the information directing the item to be shipped to a third-party item shipping location; and
    for each of one or more third-party item shipping locations,
        at the item shipping location, identifying one or more items that each have been received at the item shipping location from a customer who shipped the item as part of returning the item to the merchant;
        at a first time after the identifying and without the identified items being removed from the item shipping location, and under control of one or more configured computing devices,
            automatically obtaining information about current values at the first time for conditions corresponding to multiple possible final return destinations for the identified items, each of one or more of the conditions being a changing condition such that the current value for the changing condition is distinct from other values for the changing condition at other times, and the current values for the conditions being unknown when the identified items were previously shipped to the item shipping location; and
            for each of the identified items, automatically determining one of the multiple possible final return destinations for the identified item based at least in part on the obtained information about the current values for the conditions; and
            sending each of the identified items from the item shipping location to the automatically determined final return destination for the item, so that determination of an appropriate final return destination for an item occurs dynamically while the item is being returned.

2. The method of claim 1 wherein the information provided to each of the customers includes a zip code associated with the merchant such that an item shipped to the associated zip code will be sent to an intermediate shipping location identified by a third-party shipping organization.

3. The method of claim 2 wherein the third-party shipping organization is a governmental postal service, and wherein the third-party item shipping location to which an item from a customer is shipped is one of multiple regional bulk mail centers of the governmental postal service that is geographically proximate to the customer.

4. The method of claim 3 wherein the automatically determined final return destinations for the items being returned from customers include an item distribution center of the merchant and other customers of the merchant to whom the items are directed to fulfill orders.

5. The method of claim 1 wherein the merchant is a Web merchant, wherein the providing of the information to each of the customers is performed in response to a request from the customer to return the item, the request being received based on one or more interactions of the customer with a Web site of the Web merchant, and wherein the providing includes selecting the third-party item shipping location based at least in part on the customer and/or the item and further includes providing to the customer via the Web site a shipping label addressed to the selected shipping location for use in shipping the item being returned.

6. The method of claim 1 wherein the information provided to each of the customers includes a shipping label that will direct a package containing an item being returned to the third-party shipping location, wherein each of the shipping labels provided to a customer for returning an item includes device-readable encoded information specific to the customer and/or the item, and wherein the identifying of an item received from a customer at an item shipping location includes reading the encoded information on the shipping label on a package containing the item.

7. The method of claim 1 wherein each of the items received at an item shipping location are included as contents of an item package, and wherein the sending of each of the items from an item shipping location to an automatically determined return destination for the item includes automatically generating a new shipping label directed to the determined return destination and includes applying the generated new shipping label to the item package containing the item before shipping the item package from the item shipping location, the applying performed without opening the item package containing the item.

8. The method of claim 1 wherein the sending of each of the items from an item shipping location to an automatically determined final return destination for the item without removing the identified items from the item shipping location includes performing cross-docking from a group of incoming packages at the item shipping location to a group of outgoing packages at the item shipping location.

9. The method of claim 1 wherein the providing of information to each of at least some of the customers includes directing an item being returned to be shipped to the item shipping location for retrieval therefrom by the merchant, wherein the identifying of items received from customers at item shipping locations is performed repeatedly by one or more representatives of the merchant who retrieve those directed items at the item shipping locations, and wherein the sending of each of the identified items from the item shipping location is performed by at least one of the representatives in response to automated instructions received from a computing system of the merchant.

10. A computer-implemented method for dynamically determining a return destination for an item being returned while the item is in transit, the method comprising:

providing information to direct an item being returned from a customer to a third-party intermediate facility from which items can be shipped;

under control of one or more configured computing devices, and for a first time after the item being returned is received at the third-party intermediate facility, obtaining information about current values at the first time for conditions corresponding to multiple possible return destinations for the item, each of one or more of the conditions being a changing condition such that the current value for the changing condition is distinct from other values for the changing condition at other times; and automatically determining one of the multiple possible return destinations as being an appropriate return destination for the item based at least in part on the obtained information about the current values for the conditions; and without the item being removed from the third-party intermediate facility, initiating shipping of the item from the third-party intermediate facility to the automatically determined return destination.

11. The method of claim 10 wherein the item was previously provided to the customer by a merchant, and wherein the provided information includes a zip code associated with the merchant and/or with a party performing processing of returns for the merchant.

12. The method of claim 10 wherein the provided information includes a zip code associated with a destination distinct from the third-party intermediate facility.

13. The method of claim 10 wherein the item was previously provided to the customer by a merchant, and wherein the provided information includes a destination indicator associated with the merchant and/or with a party performing processing of returns for the merchant.

14. The method of claim 10 wherein the providing of the information to direct an item being returned to a third-party intermediate facility includes selecting the intermediate facility, and wherein the provided information includes destination information for the selected intermediate facility.

15. The method of claim 10 wherein the providing of the information is to the customer and is performed dynamically in response to an indication from the customer that the item is to be returned.

16. The method of claim 10 wherein the providing of the information is to the customer and is performed as part of providing the item to the customer.

17. The method of claim 10 wherein the third-party intermediate facility is an item shipping facility associated with a governmental postal service.

18. The method of claim 17 wherein the facility is one of multiple bulk mail centers of the governmental postal service.

19. The method of claim 10 wherein the third-party intermediate facility is a facility associated with a private shipping organization that is transporting the item.

20. The method of claim 10 wherein the item was previously provided to the customer by a merchant, and wherein the automatic determining of the return destination for the item is performed in response to identifying of the item at the third-party intermediate facility that is performed under control of a human representative of the merchant.

21. The method of claim 20 wherein the one or more configured computing devices include at least one portable computing device of the human representative.

22. The method of claim 20 wherein the identifying of the item includes automatically obtaining information about the item from an exterior of a package containing the item.

23. The method of claim 22 wherein the provided information is provided to the customer and includes a shipping label that contains information specific to the item, and wherein the obtained information from the package exterior is on the shipping label that is affixed to the package.

24. The method of claim 10 wherein the initiating of the shipping of the item from the third-party intermediate facility to the automatically determined return destination includes providing destination information corresponding to the return destination.

25. The method of claim 24 wherein the provided destination information is part of a new shipping label provided for a package containing the item.

26. The method of claim 24 wherein the initiating of the shipping of the item from the third-party intermediate facility to the automatically determined return destination includes cross-docking a package containing the item at the intermediate facility after the providing of the destination information.

27. The method of claim 10 wherein the item was previously provided to the customer by a merchant, wherein the automatic determining of the appropriate return destination is further based on an indication that the item is not defective, and wherein the determined return destination is an item distribution center of the merchant so that the returned item can be subsequently provided to another customer.

28. The method of claim 10 wherein the item was previously provided to the customer by a merchant, wherein the automatic determining of the appropriate return destination is further based on an indication that the item is not defective, and wherein the determined return destination is another customer to whom the merchant is providing the item.

29. The method of claim 10 wherein the item was previously provided to the customer by a merchant, wherein the automatic determining of the appropriate return destination is further based on an indication that the item is defective, and wherein the determined return destination is a repair facility and/or a destination associated with a party involved in supplying the item to the merchant before it was provided to the customer.

30. The method of claim 10 further including, after the item has been sent by the customer to the intermediate facility, receiving one or more indications from an administrative user to adjust how return destinations are dynamically determined for items and implementing the indicated adjustments so that the automatic determining of the return destination for the item will reflect the adjustments.

31. The method of claim 10 wherein the automatic determining of the return destination for the item is further based at least in part on multiple factors whose values are based on the current values for the conditions and on weightings assigned to the factors that indicate a relative influence of the factors on the automatic determining.

32. The method of claim 10 wherein the one or more changing conditions include conditions related to each of multiple of the possible return destinations that reflect one or more of an ability and/or need of that return destination to perform return processing for the item, an ability and/or need of that return destination to perform disposition processing for the item after the return processing is performed, and a cost and/or an amount of time to send the item to that return destination.

33. The method of claim 10 wherein the automatic determining of the one return destination for the item is further based on current conditions related to the item and/or to the customer.

34. The method of claim 10 wherein the item was previously provided to the customer by a merchant, and wherein the automatic determining of the return destination for the item is further based at least in part on one or more of an indication that the item has been recalled, a determined possibility that the return of the item involves fraud, a type of the item, information about past activities of the customer, a determined value of the customer to the merchant, preference information of the customer that is queried from the customer, and one or more reasons for the return.

35. The method of claim 10 wherein the conditions on which the appropriate return destination for the item is automatically determined include at least one of the changing conditions such that the appropriate return destination determined for the item is distinct from another return destination that would be determined to be appropriate for the item if the item is returned from the customer to the third-party intermediate facility at another time at which one or more of the at least one changing conditions has changed.

36. The method of claim 10 wherein the conditions on which the appropriate return destination for the item is automatically determined include a level of inventory of the item at the determined return destination and at each of one or more other of the multiple possible return destinations.

37. The method of claim 10 wherein the conditions on which the appropriate return destination for the item is automatically determined include a level of demand for the item at the determined return destination and at each of one or more other of the multiple possible return destinations.

38. The method of claim 10 wherein the conditions on which the appropriate return destination for the item is automatically determined include an amount of storage space available for the item at the determined return destination and at each of one or more other of the multiple possible return destinations.

39. The method of claim 10 wherein the conditions on which the appropriate return destination for the item is automatically determined include an amount of labor capacity available for handling a return of the item at the determined return destination and at each of one or more other of the multiple possible return destinations.

40. The method of claim 10 wherein the conditions on which the appropriate return destination for the item is automatically determined include one or more changing conditions related to the third-party intermediate facility.

41. The method of claim 10 wherein the current values of the conditions on which the appropriate return destination for the item is automatically determined include one or more current values that are unknown at a time of the providing of the information to direct the item being returned to the third-party intermediate facility.

42. The method of claim 10 wherein the current values for each of at least one of the changing conditions is different from a value of that changing condition at a time of the providing of the information to direct the item being returned to the third-party intermediate facility.

43. A computer-readable medium whose contents include instructions that when executed configure a computing device to direct an item to be dynamically routed to a destination while the item is in transit, the directing of the item comprising:
  identifying an intermediate location of a package before the package has reached an unknown destination, the package containing one or more items that are in transit to the unknown destination; and
  at a first time at which the package is at the identified intermediate location,
    under control of the configured computing device, dynamically determining an appropriate destination for the items based on current values at the first time for conditions that correspond to multiple possible destinations for the item, the dynamic determining including obtaining information about the current values, each of one or more of the conditions being a changing condition such that the current value for the changing condition is distinct from other values for the changing condition at other times;
    causing information associated with the package to be modified so as to identify the dynamically determined destination as the destination for the package; and
    initiating dispatch of the package from the intermediate location to the dynamically determined destination.

44. The computer-readable medium of claim 43 wherein the one or more items were previously provided to a customer, wherein the package containing the items is in transit from the customer based on the customer returning the items, and wherein the dynamically determined destination for the item is a final return destination for the items.

45. The computer-readable medium of claim 43 wherein the identified intermediate location is an item shipping facility operated by a third-party shipping organization that is transporting the package.

46. The computer-readable medium of claim 43 wherein the computing device is further configured to, for each of multiple distinct packages sent by multiple distinct entities, direct the package to an appropriate destination that is determined for the package based at least in part on the entity that sent the package.

47. The computer-readable medium of claim 46 wherein, for each of the multiple distinct packages, the directing of the package to the determined appropriate destination for the package is performed for a fee charged to the entity that sent the package.

48. The computer-readable medium of claim 46 wherein the multiple entities are distinct merchants, and wherein the determining of an appropriate destination for a package sent by a merchant is based on invocation on behalf of the merchant of one or more Web services provided by the computing device.

49. The computer-readable medium of claim 43 wherein the causing of the information associated with the package to be modified includes directing a human operator to modify the package to include an identification of the dynamically determined destination.

50. The computer-readable medium of claim 43 wherein the causing of the information associated with the package to be modified includes causing a shipping label directed to the dynamically determined destination to be generated.

51. The computer-readable medium of claim 43 wherein the computer-readable medium is a memory of a computing device.

52. A computing system configured to dynamically route an item being returned to a destination while the item is in transit, comprising:
  one or more processors;
  a first component that is configured to, when executed by at least one of the one or more processors, provide an indication to a customer of a destination indicator for a return of an item;
  a second component that is configured to, when executed by at least one of the one or more processors, automatically select one of multiple potential return destinations for the item based on current values at a time of the selecting for conditions that correspond to at least one of the multiple potential return destinations, the automatically selected return destination being distinct from an intermediate location of the item during transit from the customer to a destination, the automatic selecting of the one return destination including obtaining information about the current values, each of one or more of the conditions being a changing condition such that the current value for the changing condition is distinct from other values for the changing condition at other times; and
  a third component that is configured to, when executed by at least one of the one or more processors, and after the item is received at the intermediate location from the customer, facilitate shipping of the item from the intermediate location to the automatically selected return destination.

53. The computing system of claim 52 wherein the second component is further configured to automatically select the return destination for the item in a dynamic manner while the item is at the intermediate location.

54. The computing system of claim 52 wherein the intermediate location is an item shipping facility, and wherein the facilitating of the shipping of the item from the intermediate location to the automatically selected return destination is performed without removing the item from the item shipping facility by using cross-docking techniques.

55. The computing system of claim 52 wherein the first, second and third components are executing in memory of the computing system.

56. The computing system of claim 52 wherein the first component consists of a means for providing the indication to the customer of the destination indicator for the return of the item, wherein the second component consists of a means for automatically selecting the one potential return destination for the item based on the current values at the time of the selecting for the conditions that correspond to at least one of the multiple potential return destinations, and wherein the third component consists of a means for facilitating shipping of the item from the intermediate location to the automatically selected return destination.

* * * * *

UNITED STATES PATENT AND TRADEMARK OFFICE
CERTIFICATE OF CORRECTION

PATENT NO. : 7,617,133 B1  Page 1 of 1
APPLICATION NO. : 10/987214
DATED : November 10, 2009
INVENTOR(S) : Antony et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1306 days.

Signed and Sealed this

Nineteenth Day of October, 2010

David J. Kappos
*Director of the United States Patent and Trademark Office*